(12) United States Patent
Takeno et al.

(10) Patent No.: US 8,786,577 B2
(45) Date of Patent: Jul. 22, 2014

(54) APPARATUS AND METHOD FOR RECOGNIZING COORDINATES

(75) Inventors: Yuishi Takeno, Shizuoka-ken (JP);
Shinji Saegusa, Shizuoka-ken (JP);
Takuya Ogishima, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 247 days.

(21) Appl. No.: 13/286,664

(22) Filed: Nov. 1, 2011

(65) Prior Publication Data

US 2012/0105377 A1 May 3, 2012

Related U.S. Application Data

(60) Provisional application No. 61/409,925, filed on Nov. 3, 2010.

(51) Int. Cl.
*G06F 3/042* (2006.01)
(52) U.S. Cl.
USPC .......................................................... 345/175
(58) Field of Classification Search
CPC ........................................................ G06F 3/042
USPC .......................................................... 345/175
See application file for complete search history.

(56) References Cited

U.S. PATENT DOCUMENTS

| 6,429,857 B1 | 8/2002 | Masters et al. |
| 6,762,747 B2 | 7/2004 | Fujioka et al. |
| 7,312,787 B2 | 12/2007 | Fujioka et al. |
| 8,350,831 B2 * | 1/2013 | Drumm .......................... 345/175 |
| 2009/0058800 A1 * | 3/2009 | Ishigaki et al. ............... 345/156 |

FOREIGN PATENT DOCUMENTS

JP     11-232024     8/1999

* cited by examiner

*Primary Examiner* — William Boddie
*Assistant Examiner* — Sahlu Okebato
(74) *Attorney, Agent, or Firm* — Patterson & Sheridan, LLP

(57) ABSTRACT

According to one embodiment, a coordinate recognition apparatus includes a plurality of light-emitting devices, a plurality of light-receiving devices, and a controller. The light-emitting devices and the light-receiving devices are arranged in an array along X direction. The controller forms a plurality of groups of light paths each formed by a plurality of light paths parallel to one another in a plane including the light-emitting devices and the light-receiving devices such that an angle of the light paths varies from group to group, identifies positions p and l of each of the groups in the X direction of the light-emitting device and the light-receiving device corresponding to the light path that passes through the center of a light shield region, and calculates coordinates of the center of the light shield region in the plane based on the identified positions p and l of each of the groups.

12 Claims, 18 Drawing Sheets

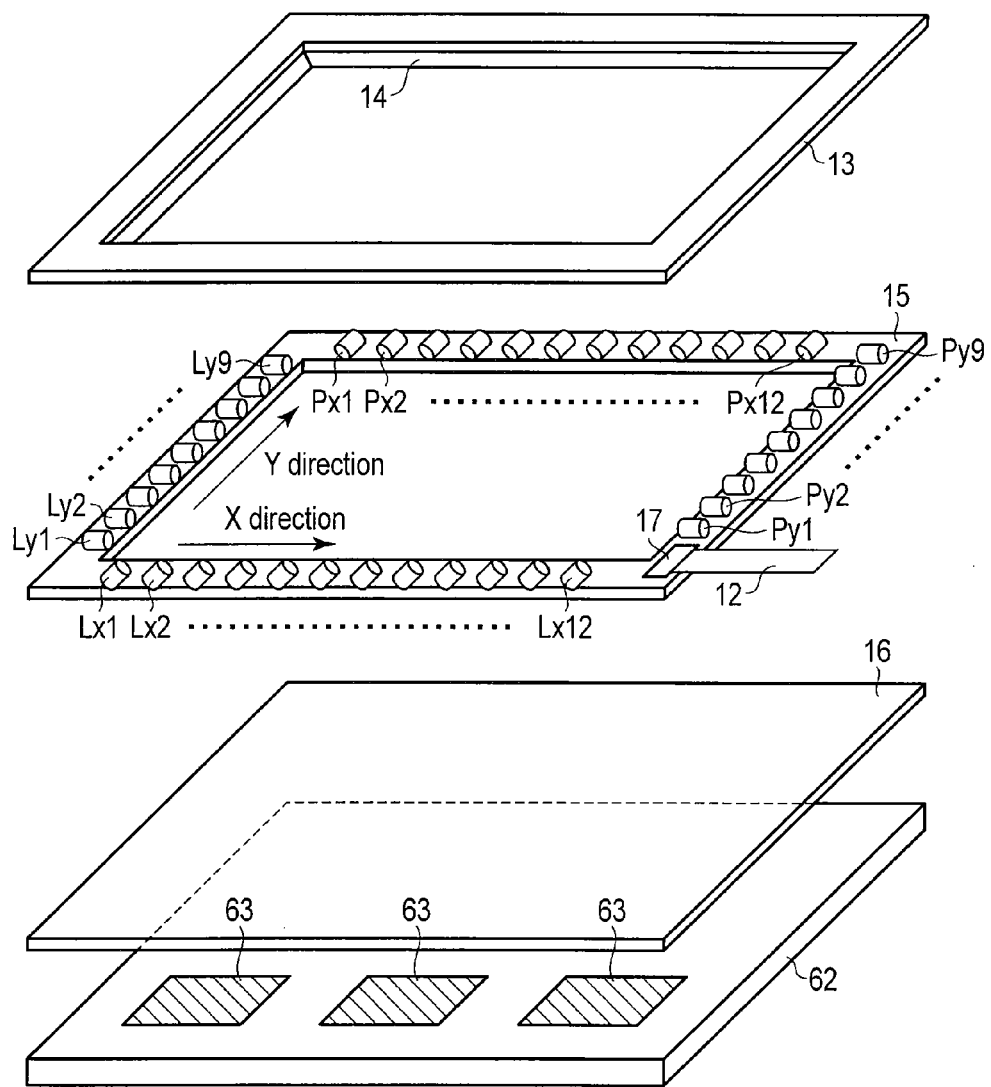
F I G. 2

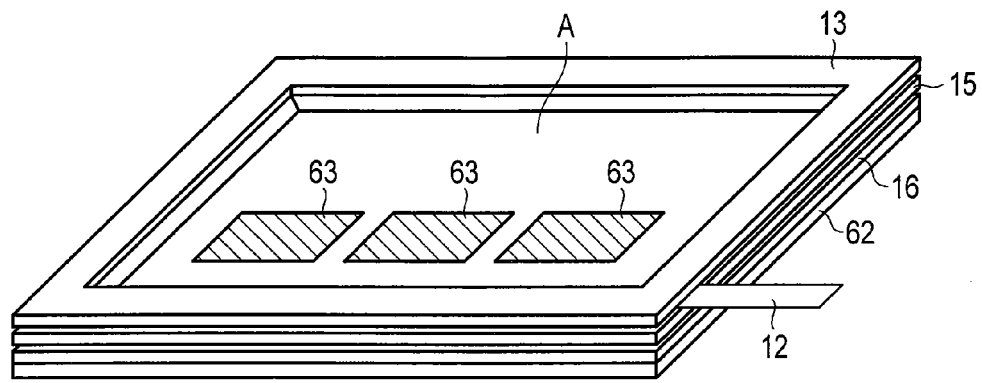
F I G. 3
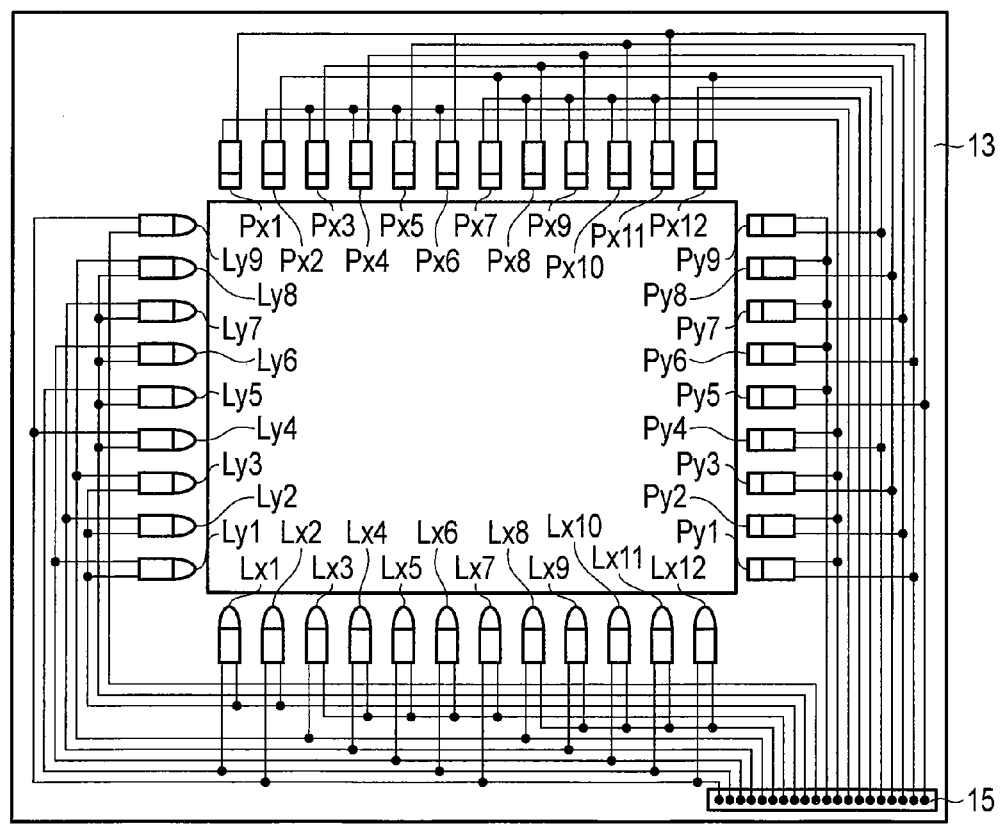
F I G. 4

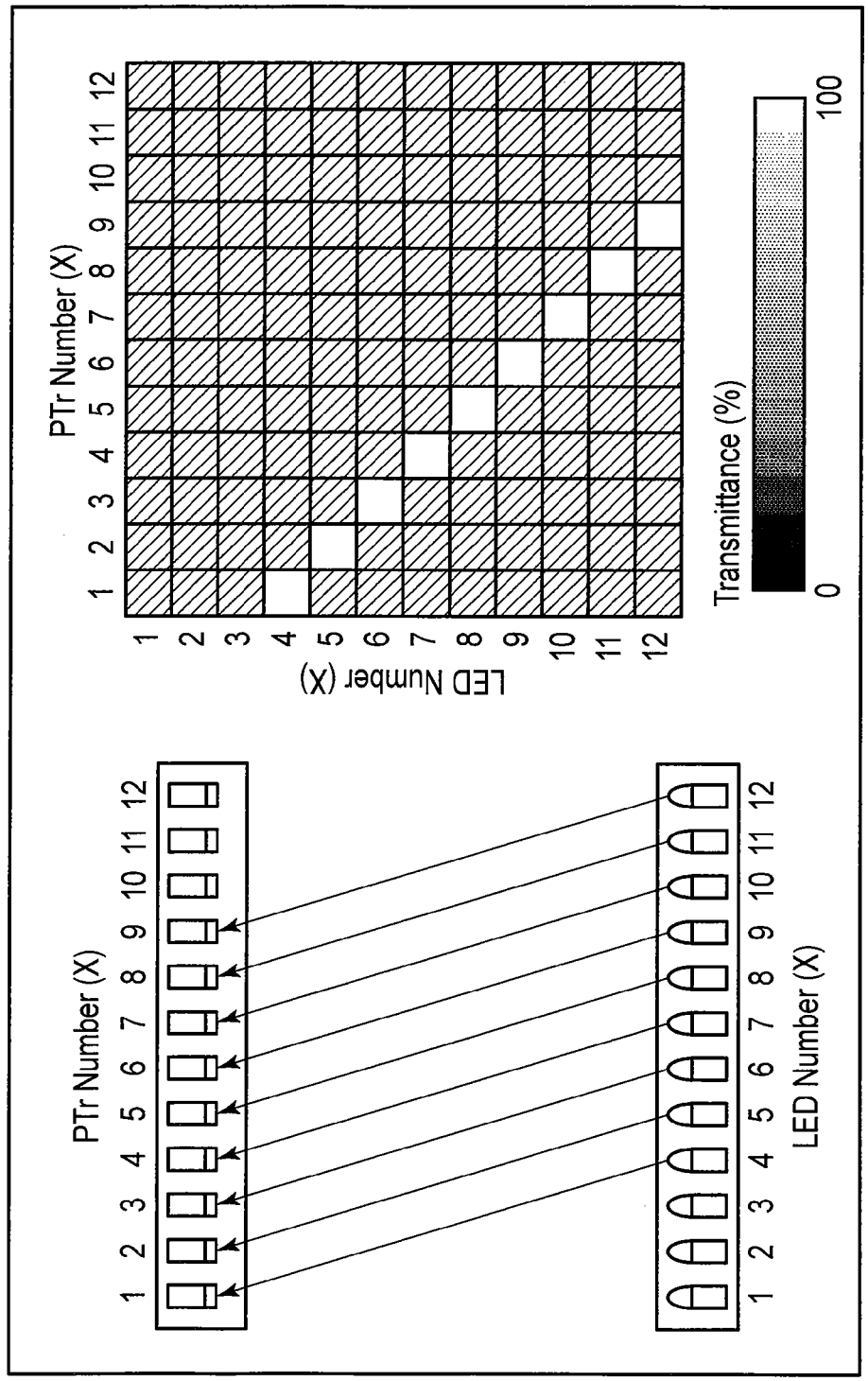
F I G. 11

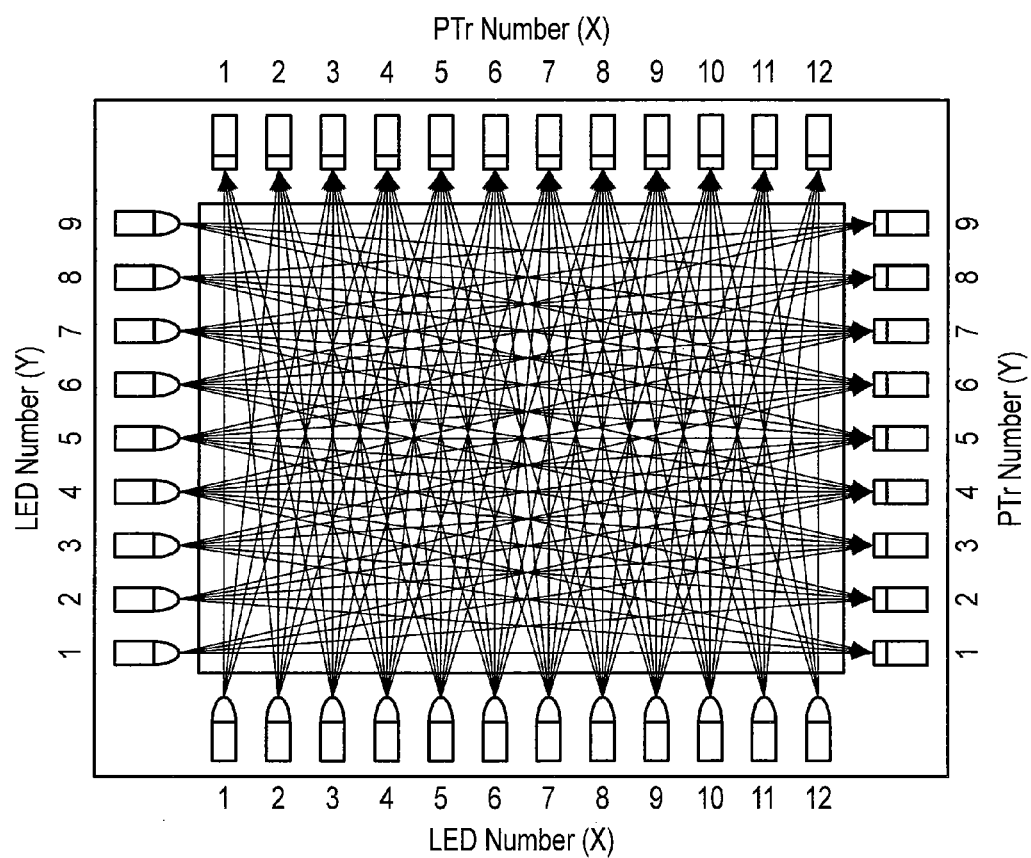
F I G. 12

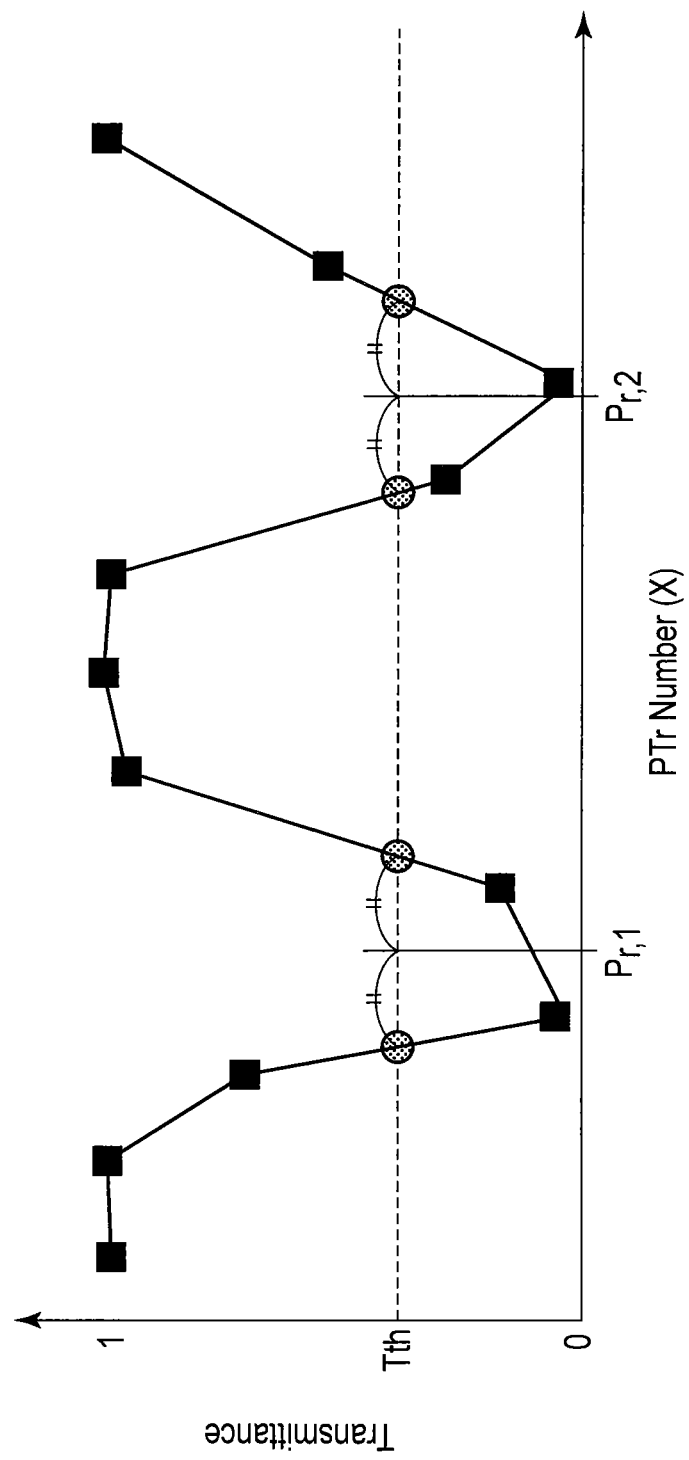
F I G. 15

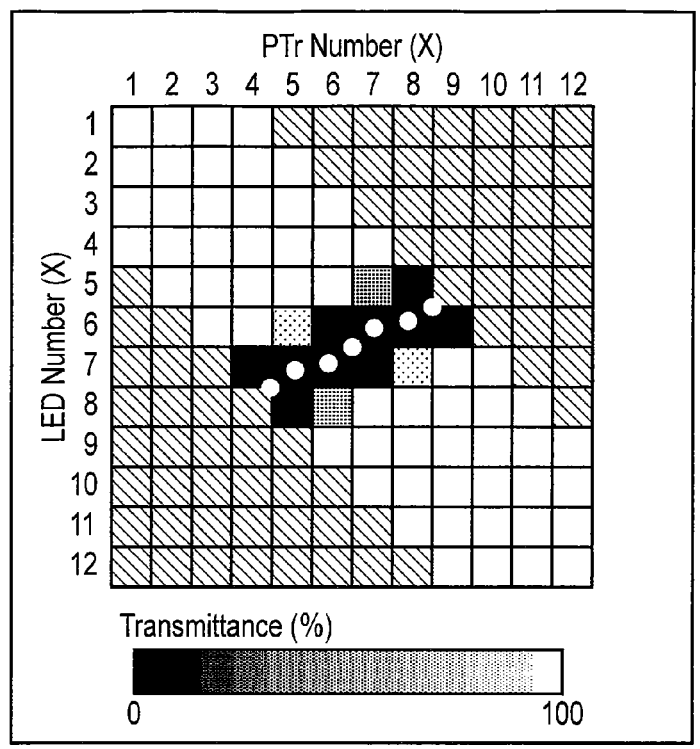
F I G. 16
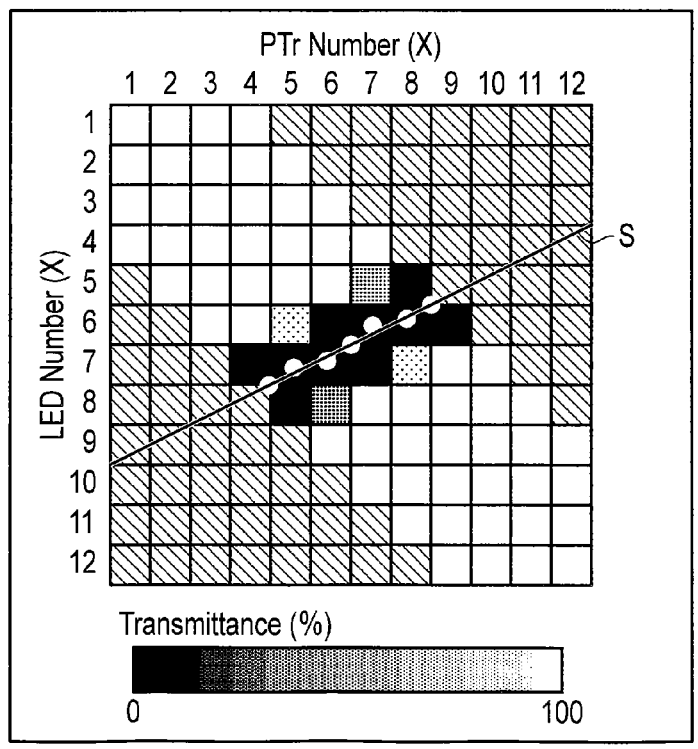
F I G. 17

| i j | 1 | 2 | 3 | ... | Nx |
|---|---|---|---|---|---|
| 1 | 18.76 | 14.74 | 3.4 | | 19.7 |
| 2 | 5.13 | 0.22 | 13.95 | | 25.69 |
| ⋮ | | | | | |
| Ny | 29.87 | 24.79 | 18.8 | | 5.25 |

F I G. 2 0

APPARATUS AND METHOD FOR RECOGNIZING COORDINATES

CROSS-REFERENCE TO RELATED APPLICATIONS

This application is based upon and claims the benefit of priority from U.S. provisional application 61/409,925, filed on Nov. 3, 2010, the entire contents of which are incorporated herein by reference.

FIELD

Embodiments described herein relate generally to an apparatus and method for recognizing coordinates of a position at which the user has manipulated.

BACKGROUND

Conventionally, optical coordinate recognition apparatuses are known, such as a touch panel including a plurality of infrared light-emitting devices and a plurality of infrared light-receiving devices provided so as to be opposed to the respective infrared light-emitting devices.

In general, such an optical coordinate recognition apparatus detects whether a light path formed between a pair of light-emitting device and a light-receiving device is shielded or not, and calculates coordinates of a position at which the user has manipulated based on the detected result.

In this scheme, however, the resolution achieved will be as low as the light path formed between an LED and a PTR of each pair. It is thereby difficult to identify the precise manipulation position.

For the sake of improved precision, it is possible to obtain a higher resolution by increasing the number of light-emitting devices and light-receiving devices and narrowing the distance between the light paths such that the light paths are closer to one another. Due to restrictions in size of the light-emitting devices and the light-receiving devices, however, there is a limit to how narrow the distance between the light paths can be made.

Under the circumstances, it has been desired to develop a technique allowing an optical coordinate recognition apparatus to identify the manipulation position with high precision.

BRIEF DESCRIPTION OF THE DRAWINGS

FIG. 2 is an exploded perspective view of an input device, for example, included in the coordinate recognition apparatus according to the embodiment;

FIG. 3 is a perspective view illustrating a state in which the elements shown in FIG. 2 are fixed;

FIG. 4 schematically shows wiring of light-emitting devices and light-receiving devices included in the coordinate recognition apparatus according to the embodiment;

FIG. 11 shows a group of light paths each formed by a light-emitting device and a light-receiving device arranged third to the left of the light-receiving device opposite to the light-emitting device according to the embodiment;

FIG. 12 shows all the light paths formed in the embodiment;

FIG. 15 illustrates a scheme of calculating positions p, l according to the embodiment;

FIG. 16 shows the calculated positions p, l plotted on the distribution of transmittances shown in FIG. 14;

FIG. 17 shows a regression line of the plot shown in FIG. 16;

FIG. 20 shows relationship of distance $d_{ij}$ between coordinates ($x^{Xi}$, $y^{Xi}$) and ($x^{Yj}$, $y^{Yj}$) and identification numbers i, j, according to the embodiment.

DETAILED DESCRIPTION

In general, according to one embodiment, a coordinate recognition apparatus includes a plurality of light-emitting devices, a plurality of light-receiving devices, and a controller.

The light-emitting devices are arranged in an array along an arbitrary X-direction. The light-receiving devices are arranged in an array parallel to the array of the light-emitting devices, and configured to detect light emitted by the light-emitting devices. The controller selectively drives the light-emitting devices and the light-receiving devices, forms a plurality of groups of light paths each formed by a plurality of light paths parallel to one another in a plane including the light-emitting devices and the light-receiving devices such that an angle of the light paths varies from group to group, identifies a position p and a position l of each of the groups of light paths based on an output from each of the light-receiving devices, the position p being in the X direction of the light-receiving device corresponding to the light path that passes through the center of a region shielded by an object, the position l being in the X direction of the light-emitting device forming the same light path, and calculates coordinates of the center of the light shield region in the plane based on the identified positions p and l of each of the groups of light paths.

An embodiment will be described with reference to the accompanying drawings.

The present embodiment describes a coordinate recognition apparatus configured to optically detect a touch manipulation on the display, by way of illustration.

[Hardware Configuration of Coordinate Recognition Apparatus]

Figure 1:
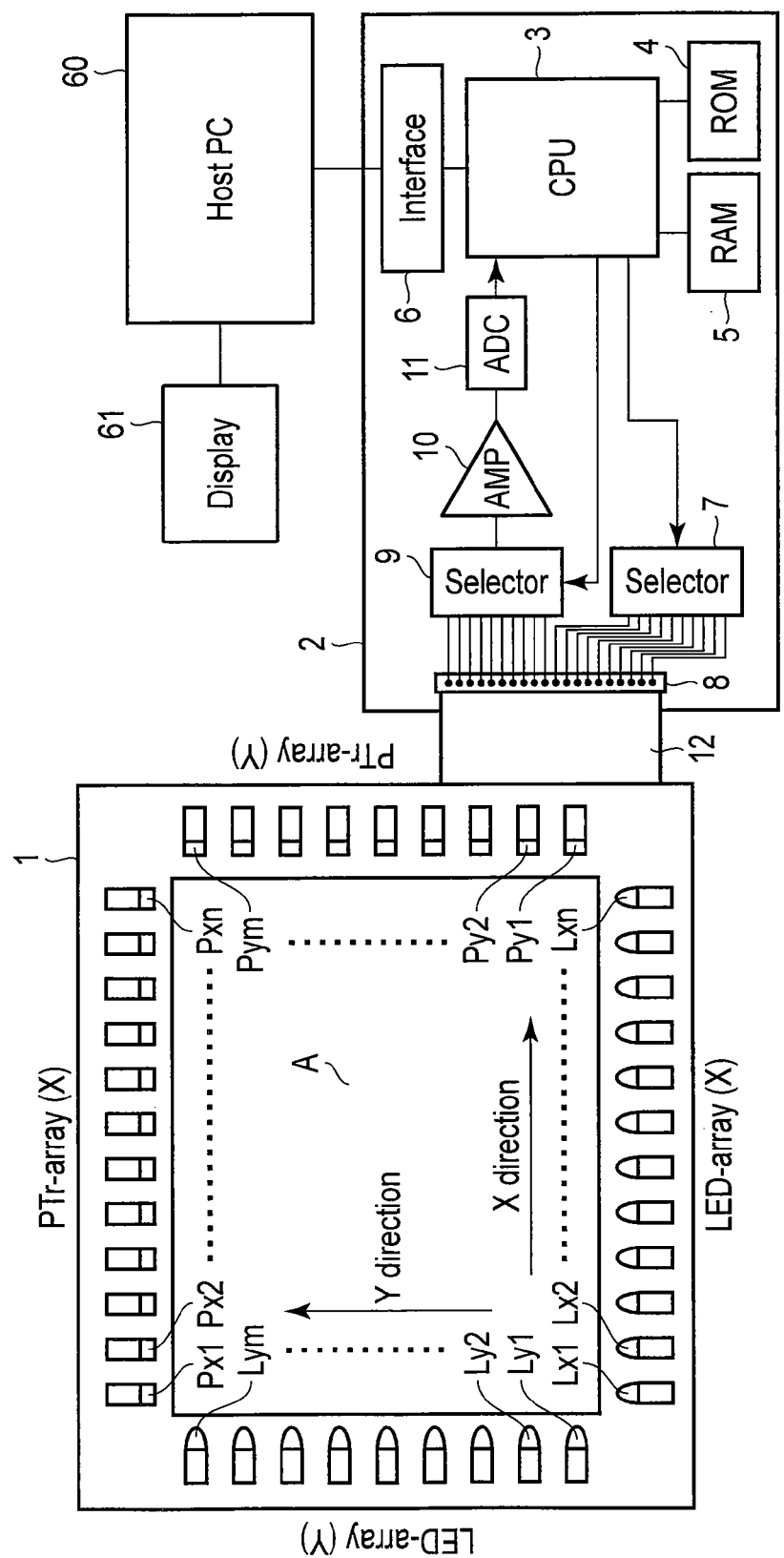
FIG. 1 is a block diagram illustrating a hardware configuration of a coordinate recognition apparatus according to an embodiment.

FIG. 1 is a block diagram illustrating a hardware configuration of a coordinate recognition apparatus, for example, according to the present embodiment. The coordinate recognition apparatus includes an input device 1 and a controller 2.

The input device 1 includes a plurality of light-emitting devices Lx1 to Lxn (where n is an integer and n≥1) arranged in a one-dimensional array, light-receiving devices Px1 to Pxn arranged in a one-dimensional array parallel to the array of the light-emitting devices Lx1 to Lxn, light-emitting devices Ly1 to Lym (where m is an integer and m≥1) arranged in a one-dimensional array along a direction orthogonal to the direction of the array of the light-emitting devices Lx1 to Lxn, and light-receiving devices Py1 to Pyn arranged in a one-dimensional array parallel to the array of the light-receiving devices Ly1 to Lym.

The light-emitting devices Lx1 to Lxn, Lx1 to Lym are light-emitting diodes (LEDs) configured to emit infrared light when driven by the controller 2. The light-receiving devices Px1 to Pxn, Py1 to Pym are phototransistors (PTrs) configured to receive infrared light and output a signal responsive to the intensity of the received infrared light to the controller 2. A region A surrounded by the light-emitting devices Lx1 to Lxn, Ly1 to Lym and the light-receiving devices Px1 to Pxn, Py1 to Pym is a region in which a manipulation by an object, such as a finger of a user or a stylus, is detected.

In the present embodiment, the direction of the array of the light-emitting devices Lx1 to Lxn and the light-receiving devices Px1 to Pxn is defined as X direction, and the direction of the array of the light-emitting devices Ly1 to Lym and the light-receiving devices Py1 to Pym is defined as Y direction. Assume that n=12 and m=9, for example.

The controller 2 comprises a central processing unit (CPU) 3, a read only memory (ROM) 4, a random access memory (RAM) 5, an interface 6, a selector 7, a connector 8, a selector 9, an amplifier 10, and an AD converter 11, for example.

The ROM 4 stores fixed data, e.g., a variety of default values and computer programs. The RAM 5 functions as a main memory, and forms a variety of work memory areas.

The interface 6 is an RS-232C interface, for example, and is configured to connect a host computer 60 and the coordinate recognition apparatus for communications therebetween. The host computer 60 is a personal computer, for example, and is connected to a display 61, which is a liquid crystal display (LCD), for example. The input device 1 is arranged in front of the display 61. On the display 61, the host computer 60 displays a variety of graphical user interface (GUI) elements, which can be manipulated via the input device 1.

An end of a flexible cable 12 is connected to the connector 8. The other end of the flexible cable 12 is connected to the input device 1.

The CPU 3 executes computer programs stored in the ROM 4, and executes a variety of processes relating to actions of the coordinate recognition apparatus. In particular, in order to recognize coordinates (which will hereinafter be referred to as manipulation coordinates) of the position at which the user has manipulated on a display surface of the display 61, the CPU 3 outputs signals for driving the light-emitting devices Lx1 to Lx12, Ly1 to Ly9 to the selector 7.

The selector 7 selectively supplies the driving signals input from the CPU 3 to the light-emitting devices Lx1 to Lx12, Ly1 to Ly9 via the connector 8 and the flexible cable 12. The light-emitting devices to which the driving signals are supplied emit infrared light.

When the light-receiving devices Px1 to Px12, Py1 to Py9 receive the infrared light emitted by the light-emitting devices Lx1 to Lx12, Ly1 to Ly9, a detection signal responsive to the intensity of the received infrared light is output to the selector 9 via the flexible cable 12 and the connector 8. The selector 9 selectively captures the input detection signal and output the captured detection signal to the amplifier 10.

The amplifier 10 amplifies the input detection signal to a predetermined level, and outputs the amplified detection signal to the AD converter 11. The AD converter 11 converts the detection signal input from the amplifier 10 into a digital signal, and outputs the converted digital detection signal to the CPU 3.

The CPU 3 calculates the manipulation coordinates, at which the user has manipulated, using the digital detection signal input from the AD converter 11, and outputs the calculated result to the host computer 60 via the interface 6. The host computer 60 executes a variety of processes using the manipulation coordinates input from the controller 2. For example, the host computer 60 compares the manipulation coordinates with coordinates of the GUI elements displayed on the display 61, and when an operable GUI element exists at the manipulation coordinates, the host computer 60 executes a process corresponding to each of the GUI elements. In another example, the host computer 60 enlarges or reduces an image displayed on the display 61, or slides the image in the length or width direction, as the manipulation coordinates vary in time.

A configuration of the input device 1 will be described in detail below. FIG. 2 is an exploded perspective view of the input device 1 and an LCD panel 62 included in the display 61.

As shown in FIG. 2, the input device 1 includes an outer frame 13, a printed wiring board 15, and a transparent acrylic plate 16. The outer frame 13 is formed of ABS resin, for example. A rectangular opening of the outer frame 13 corresponds to the region A shown in FIG. 1, from which an manipulation by the user is detected. A cover 14 is provided along the edges of the opening at a lower part of the outer frame 13, so as to cover the light-emitting devices Lx1 to Lx12, Ly1 to Ly9, and the light-receiving devices Px1 to Px12, Py1 to Py9. The cover 14 lets infrared light to pass through, and is formed of black resin that is dark enough to prevent the light-emitting devices Lx1 to Lx12, Ly1 to Ly9 and the light-receiving devices Px1 to Px12, Py1 to Py9 from being visible from the inside of the opening.

The printed wiring board 15 has the shape of a rectangular frame including an opening of a size approximately equal to that of the opening of the outer frame 13. On the longer sides of the printed wiring board 15, as indicated by "X direction" in FIG. 2, the light-emitting devices Lx1 to Lx12 and the light-receiving devices Px1 to Px12 are arranged at equal intervals so as to be opposed to each another. On the shorter sides of the printed wiring board 15 as indicated by "Y direction" in FIG. 2, on the other hand, the light-emitting devices Ly1 to Ly9 and the light-receiving devices Py1 to Py9 are arranged at equal intervals so as to be opposed to each other.

According to the above-described configuration, both of the light-emitting devices Lx1 to Lx12, Ly1 to Ly9 and the light-receiving devices Px1 to Px12, Py1 to Py9 lie on the same plane. This plane will be defined as XY plane.

The printed wiring board 15 includes a connector 17, to which one end of the flexible cable 12 is connected.

The acrylic plate 16 is a rectangular plate of a size greater than the openings of the outer frame 13 and the printed wiring board 15 and less than the outer size of the outer frame 13.

A region 63, indicated by diagonal shading on the LCD panel 62 in FIG. 2, represents an image of a GUI element, for example, displayed on the LCD panel 62.

FIG. 3 is a perspective view illustrating a state in which the outer frame 13, the printed wiring board 15, the acrylic plate 16, and the LCD panel 62 are layered in this order and fixed. The image displayed on the LCD panel 62 is visible from the outside through the acrylic plate 16. When the user touches the acrylic plate 16 with his or her finger or a stylus, for example, in order to manipulate the screen of the LC panel 62, some of the light paths formed in the XY plane by the light-emitting devices Lx1 to Lx12, Ly1 to Ly9 and the light-receiving devices Px1 to Px12, Py1 to Py9 are interrupted. As will be described later, the controller 2 recognizes coordinates of the manipulation position in the XY plane, based on combinations of light-emitting devices and light-receiving devices corresponding to the interrupted light paths.

FIG. 4 schematically shows wiring of the light-emitting devices Lx1 to Lx12, Ly1 to Ly9, and the light-receiving devices Px1 to Px12, Py1 to Py9. As shown, wiring for the light-emitting devices is reduced by commonly wiring anodes of the light-emitting devices Lx1, Lx6, Lx11, Ly5, the light-emitting devices Lx2, Lx7, Lx12, Ly4, Ly9, the light-emitting devices Lx3, Lx8, Ly3, Ly8, the light-emitting devices Lx4, Lx9, Ly2, Ly7, and the light-emitting devices Lx5, Lx10, Ly1, Ly6, and commonly wiring cathodes of the light-emitting devices Lx1, Lx2, Ly1 to Ly3, the light-emitting devices Lx3 to Lx7, the light-emitting devices Lx8 to Lx12, and the light-emitting devices Ly4 to Ly8. Similarly, wiring for the light-receiving devices is reduced by commonly wiring emitters and collectors of some of the light-receiving devices Px1 to Px12, Py1 to Py9.

[Light Paths]

The controller 2 selectively drives the light-emitting devices Lx1 to Lx12, Ly1 to Ly9 and the light-receiving devices Px1 to Px12, Py1 to Py9, thereby forming a plurality of groups of light paths, each formed of a plurality of light paths in parallel to one another in the XY plane such that the angle of the light paths varies from group to group. The light paths can be selectively formed by causing the selector 7 to select an anode and cathodes used to supply the light-emitting device with a driving signal, and causing the selector 9 to select a emitters and collectors used to capture an output from the light-receiving device.

Details about the groups of light paths formed by the light-emitting devices Lx1 to Lx12, Ly1 to Ly9, and the light-receiving devices Px1 to Px12, Py1 to Py9 will be described below, with reference to FIGS. 5 to 11.

In each of FIGS. 5 to 11, a group of light paths formed by the light-emitting devices Lx1 to Lx12 and the light-receiving devices Px1 to Px12 arranged in X direction are shown by a schematic diagram at the left, and the results of detecting infrared light of the light-receiving devices Px1 to Px12, when the group of light paths shown in the schematic diagram is not shielded, are shown in the diagram at the right. Numbers 1 to 12 are assigned as LED Number (X) to the light-emitting devices Lx1 to Lx12, respectively, and numbers 1 to 12 are assigned as PTr Number (X) to the light-receiving devices Px1 to Px12, respectively, numbers 1 to 9 are assigned as LED Number (Y) to the light-receiving devices Ly1 to Ly9, respectively, and numbers 1 to 9 are assigned as PTr Number (Y) to the light-receiving devices Py1 to Py9, respectively. In each of FIGS. 5 to 11, the results of detecting infrared light are shown in a matrix in which the lateral axis represents PTr Number (X) and the vertical axis represents LED Number (X), such that the detection results of pairs of light-emitting devices and light-receiving devices corresponding to the respective squares are shaded differently according to transmittances. The transmittance is obtained by dividing the output from the light-receiving devices Px1 to Px12 by a predetermined reference value. The squares other than the squares corresponding to the light paths shown at the left, i.e., the non-detection region, is diagonally shaded.

Figure 5:
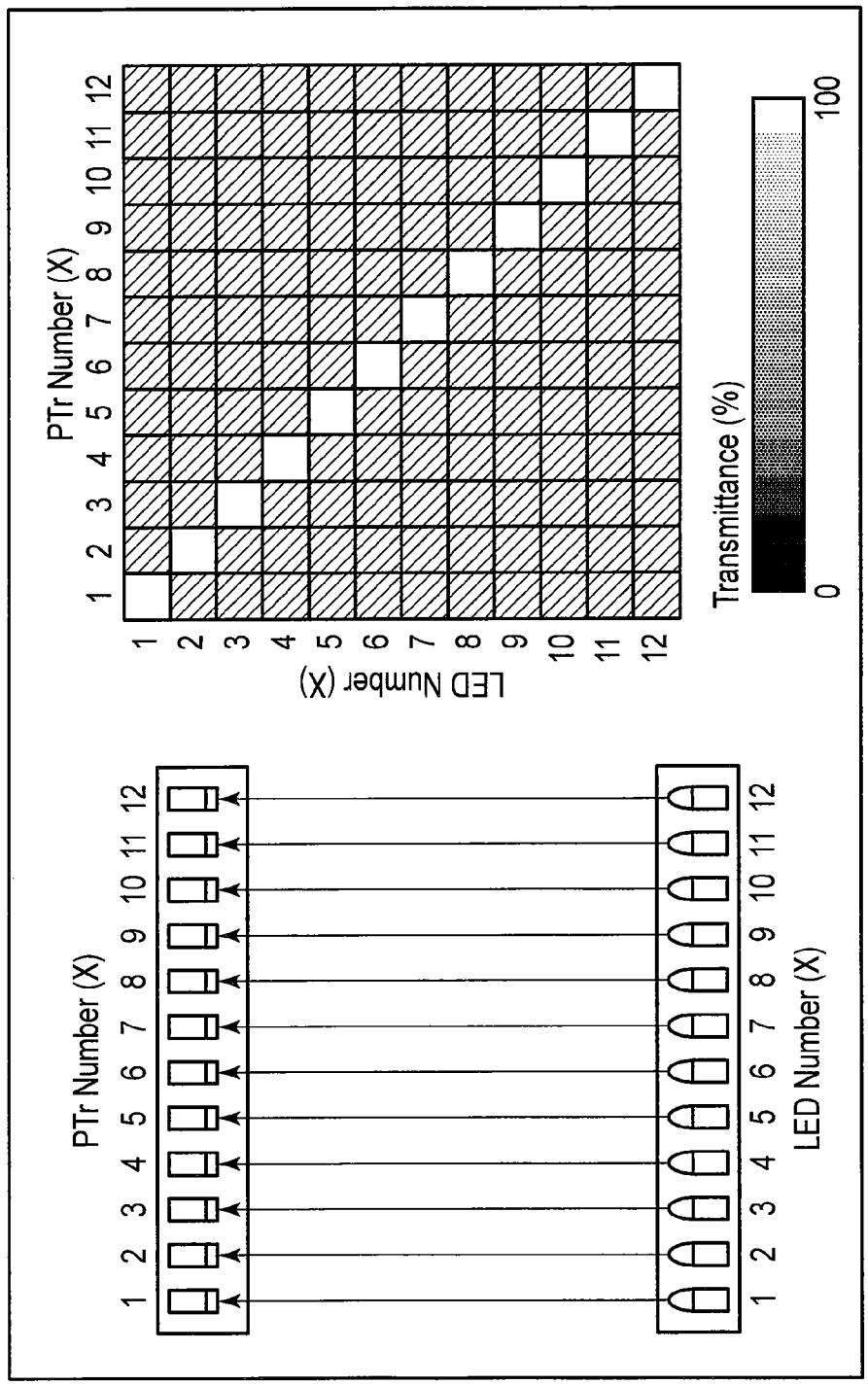
FIG. 5 shows a group of light paths each formed by a light-emitting device and a light-receiving device opposite to each other, according to the embodiment.

FIG. 5 shows a state in which a group of 12 parallel light paths, each formed by a light-emitting device and a light-receiving device opposite to each another, is formed. In this case, LED Number (X) of the light-emitting device forming one of the light paths and PTr Number (X) of the light-receiving device forming the same light path agree. The light paths are parallel to Y direction. This group of light paths will be referred to as a group of light paths of order r=0.

Figure 6:
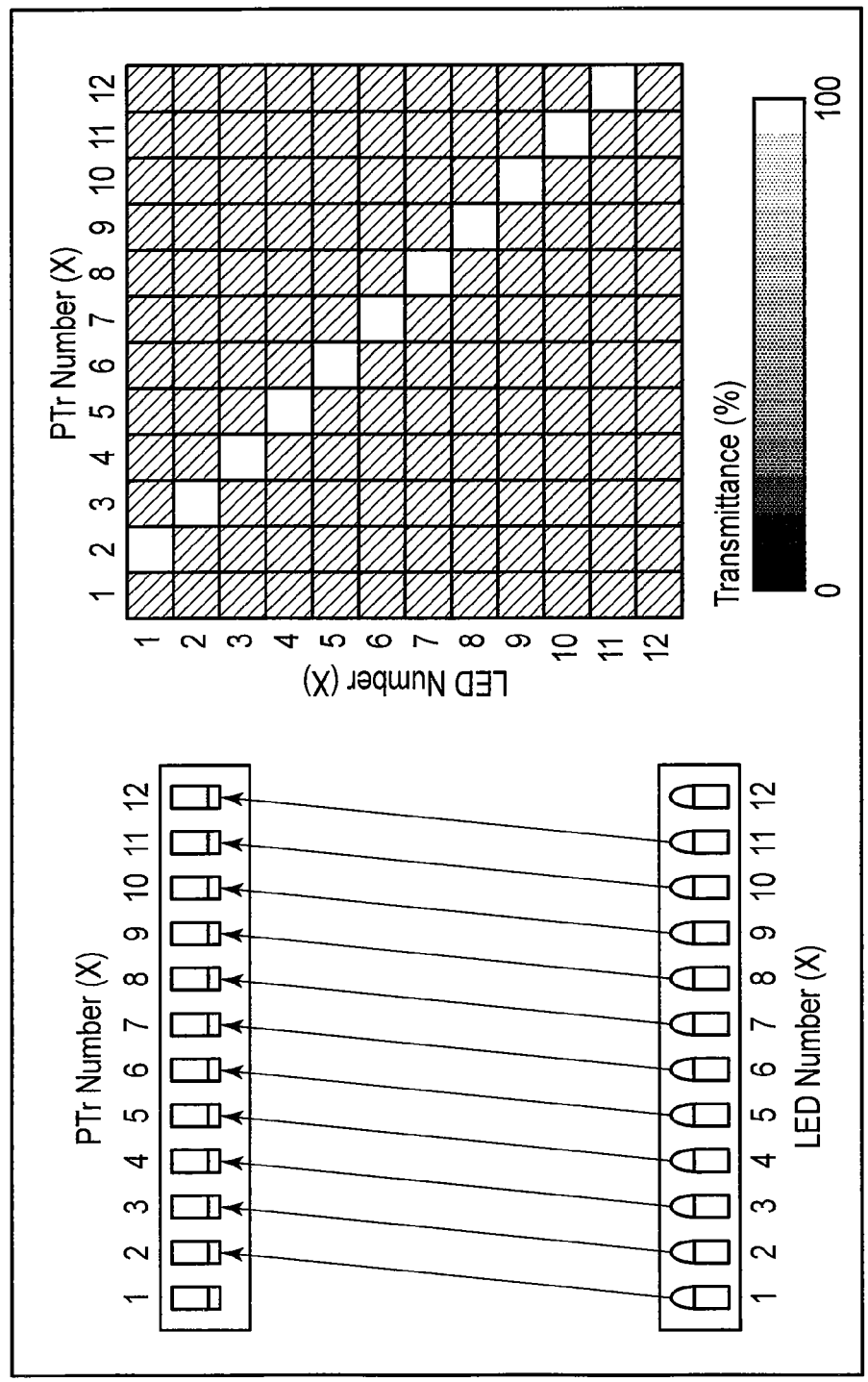
FIG. 6 shows a group of light paths each formed by a light-emitting device and a light-receiving device arranged next on the right of the light-receiving device opposite to the light-emitting device, according to the embodiment.

FIG. 6 shows a state in which a group of 11 parallel light paths, each formed by a light-emitting device and a light-receiving device arranged next on the right of the light-receiving device opposite to the light-emitting device, is formed. In this case, PTr Number (X) of the light-receiving device forming each of the light paths is greater by 1 than LED Number (X) of the light-emitting device forming a pair with the light-receiving device. This group of light paths will be referred to as a group of light paths of order r=+1.

Figure 7:
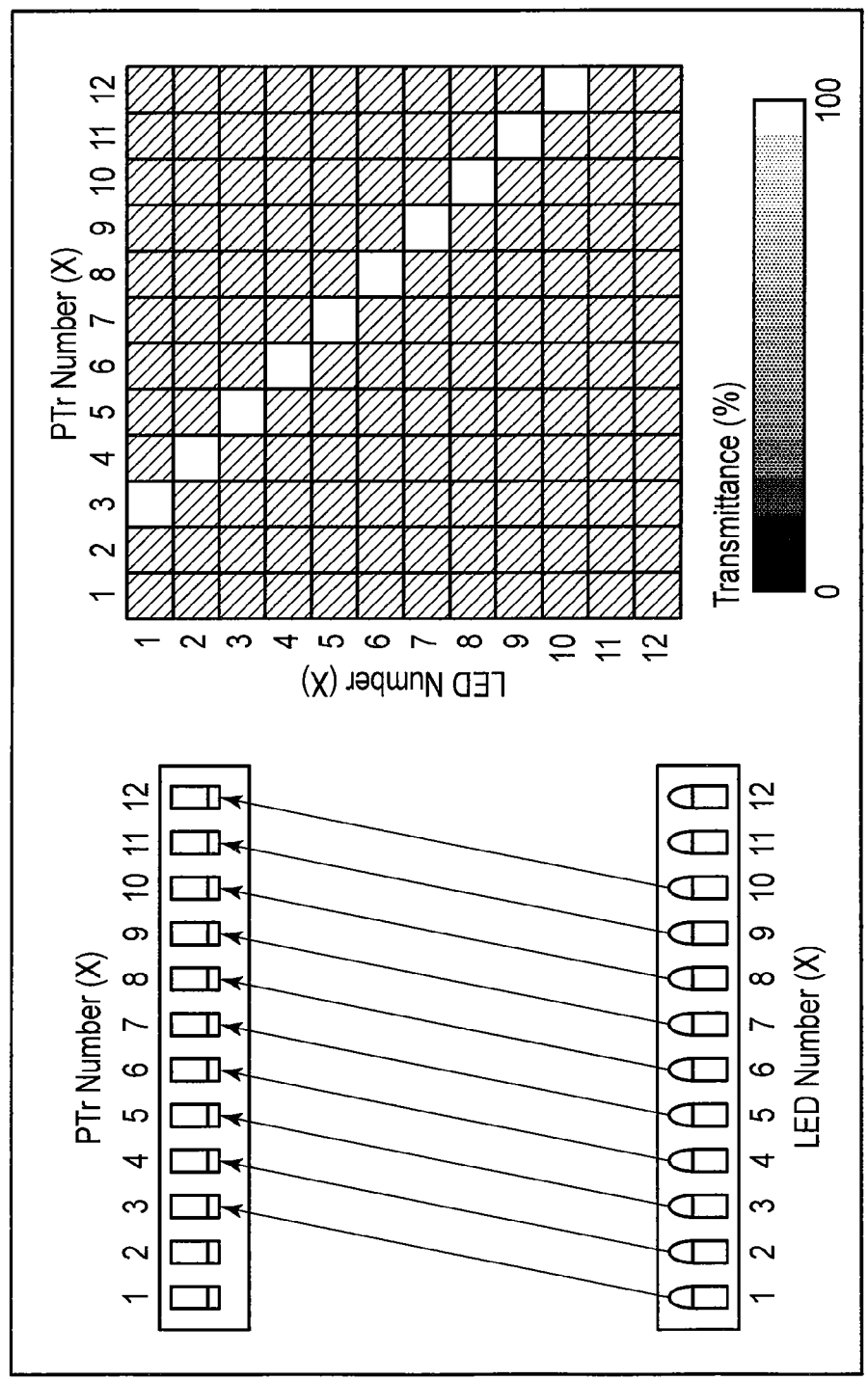
FIG. 7 shows a group of light paths each formed by a light-emitting device and a light-receiving device arranged second to the right of the light-receiving device opposite to the light-emitting device according to the embodiment.

FIG. 7 shows a state in which a group of 10 parallel light paths, each formed by a light-emitting device and a light-receiving device arranged second to the right of the light-receiving device opposite to the light-emitting device, is formed. In this case, PTr Number (X) of the light-receiving device forming each of the light paths is greater by 2 than LED Number (X) of the light-emitting device forming a pair with the light-receiving device. This group of light paths will be referred to as a group of light paths of order r=+2.

Figure 8:
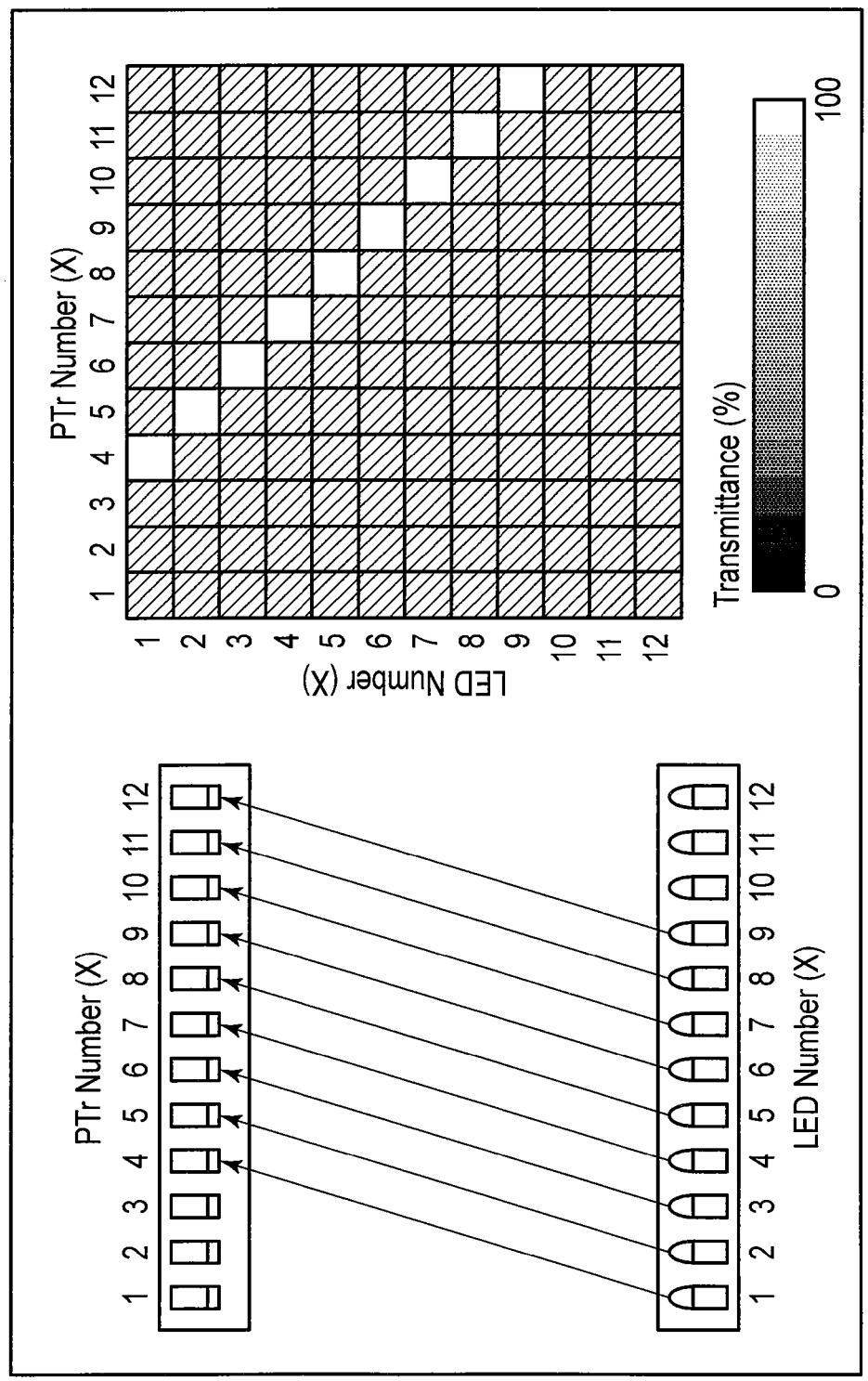
FIG. 8 shows a group of light paths each formed by a light-emitting device and a light-receiving device arranged third to the right of the light-receiving device opposite to the light-emitting device according to the embodiment.

FIG. 8 shows a state in which a group of 9 parallel light paths, each formed by a light-emitting device and a light-receiving device arranged third to the right of the light-receiving device opposite to the light-emitting device, is formed. In this case, PTr Number (X) of the light-receiving device forming each of the light paths is greater by 3 than LED Number (X) of the light-emitting device forming a pair with the light-receiving device. This group of light paths will be referred to as a group of light paths of order r=+3.

Figure 9:
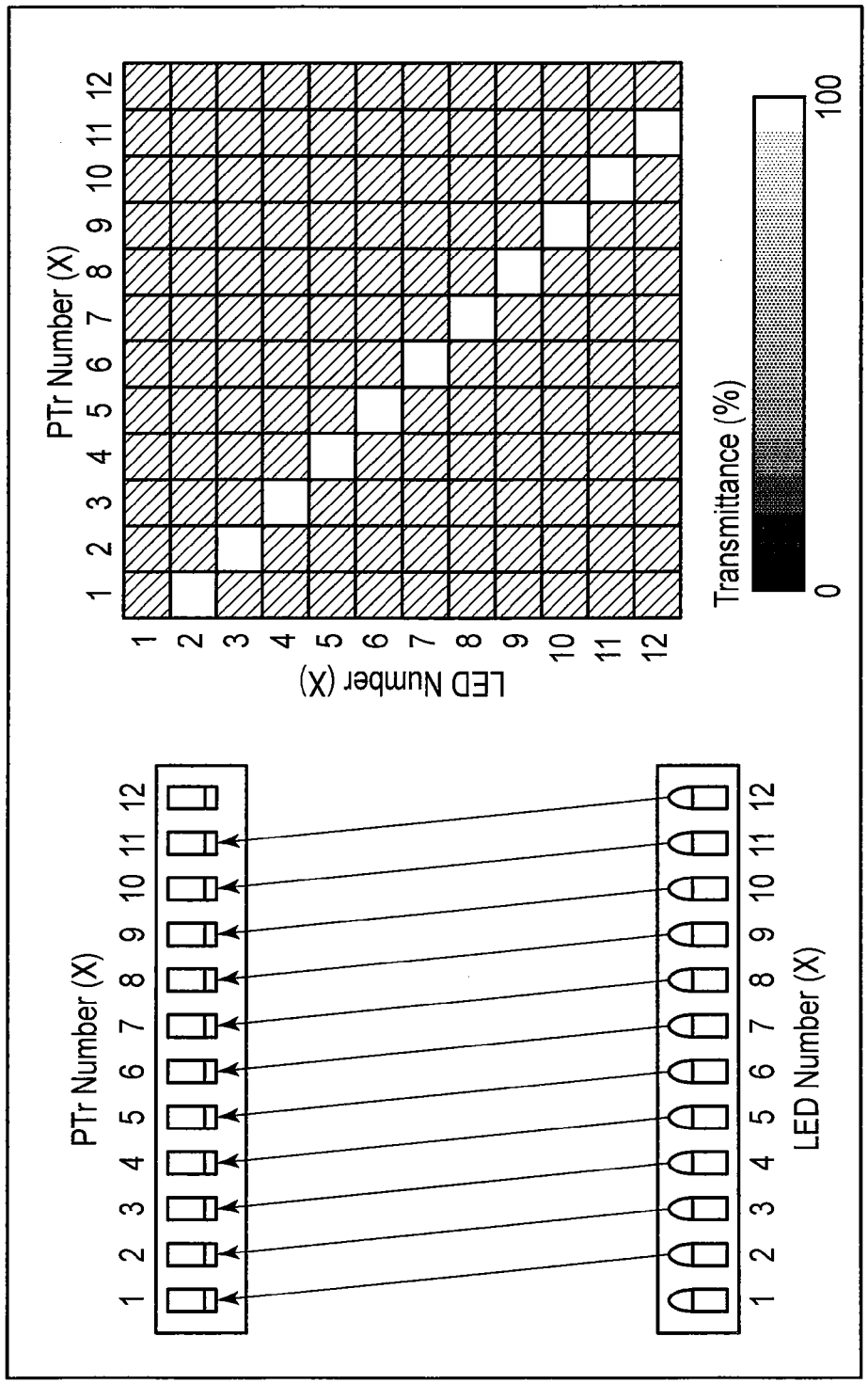
FIG. 9 shows a group of light paths each formed by a light-emitting device and a light-receiving device arranged next on the left of the light-receiving device opposite to the light-emitting device according to the embodiment.

FIG. 9 shows a state in which a group of 11 parallel light paths, each formed by a light-emitting device and a light-receiving device arranged next on the left of the light-receiving device opposite to the light-emitting device, is formed. In this case, PTr Number (X) of the light-receiving device forming each of the light paths is less by 1 than LED Number (X) of the light-emitting device forming a pair with the light-receiving device. This group of light paths will be referred to as a group of light paths of order r=−1.

Figure 10:
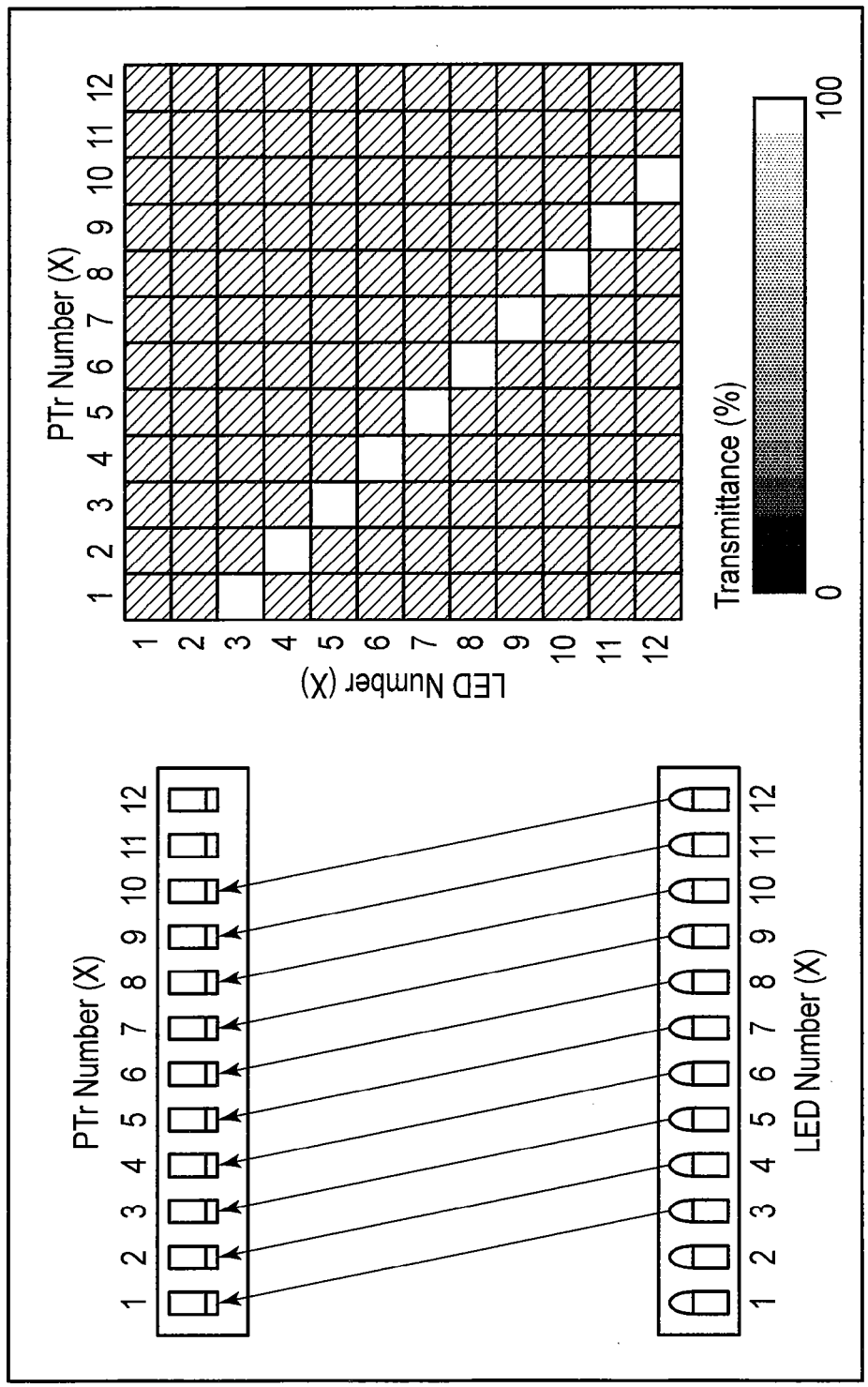
FIG. 10 shows a group of light paths each formed by a light-emitting device and a light-receiving device arranged second to the left of the light-receiving device opposite to the light-emitting device according to the embodiment.

FIG. 10 shows a state in which a group of 10 parallel light paths, each formed by a light-emitting device and a light-receiving device arranged second to the left of the light-receiving device opposite to the light-emitting device, is formed. In this case, PTr Number (X) of the light-receiving device forming each of the light paths is less by 2 than LED Number (X) of the light-emitting device forming a pair with the light-receiving device. This group of light paths will be referred to as a group of light paths of order r=−2.

FIG. 11 shows a state in which a group of 9 parallel light paths, each formed by a light-emitting device and a light-receiving device arranged third to the left of the light-receiving device opposite to the light-emitting device, is formed. In this case, PTr Number (X) of the light-receiving device forming each of the light paths is less by 3 than LED Number (X) of the light-emitting device forming a pair with the light-receiving device. This group of light paths will be referred to as a group of light paths of order r=−3.

The order r of each group of light paths and LED Number (X) and PTr Number (X) of the light-receiving device and the light-receiving device, respectively, forming each of the light paths of the group of light paths, satisfy the relationship as expressed by formula (1):

$$r = \text{PTr Number}(X) - \text{LED Number}(X) \quad (1)$$

While the description given above with reference to FIGS. 5-11 relates to the groups of light paths formed by the light-emitting devices Lx1 to Lx12 and the light-receiving devices Px1 to Px12 arranged in X direction, the groups of light paths of orders r=0, +1, +2, +3, −1, −2, −3 are similarly formed by the light-emitting devices Ly1 to Ly12 and the light-receiving devices Py1 to Py12 arranged in Y direction.

FIG. 12 shows all the light paths formed by the light-emitting devices Lx1 to Lx12, Ly1 to Ly9 and the light-receiving devices Px1 to Px12, Py1 to Py9.

[Actions Relating to Coordinate Recognition]

Figure 13:
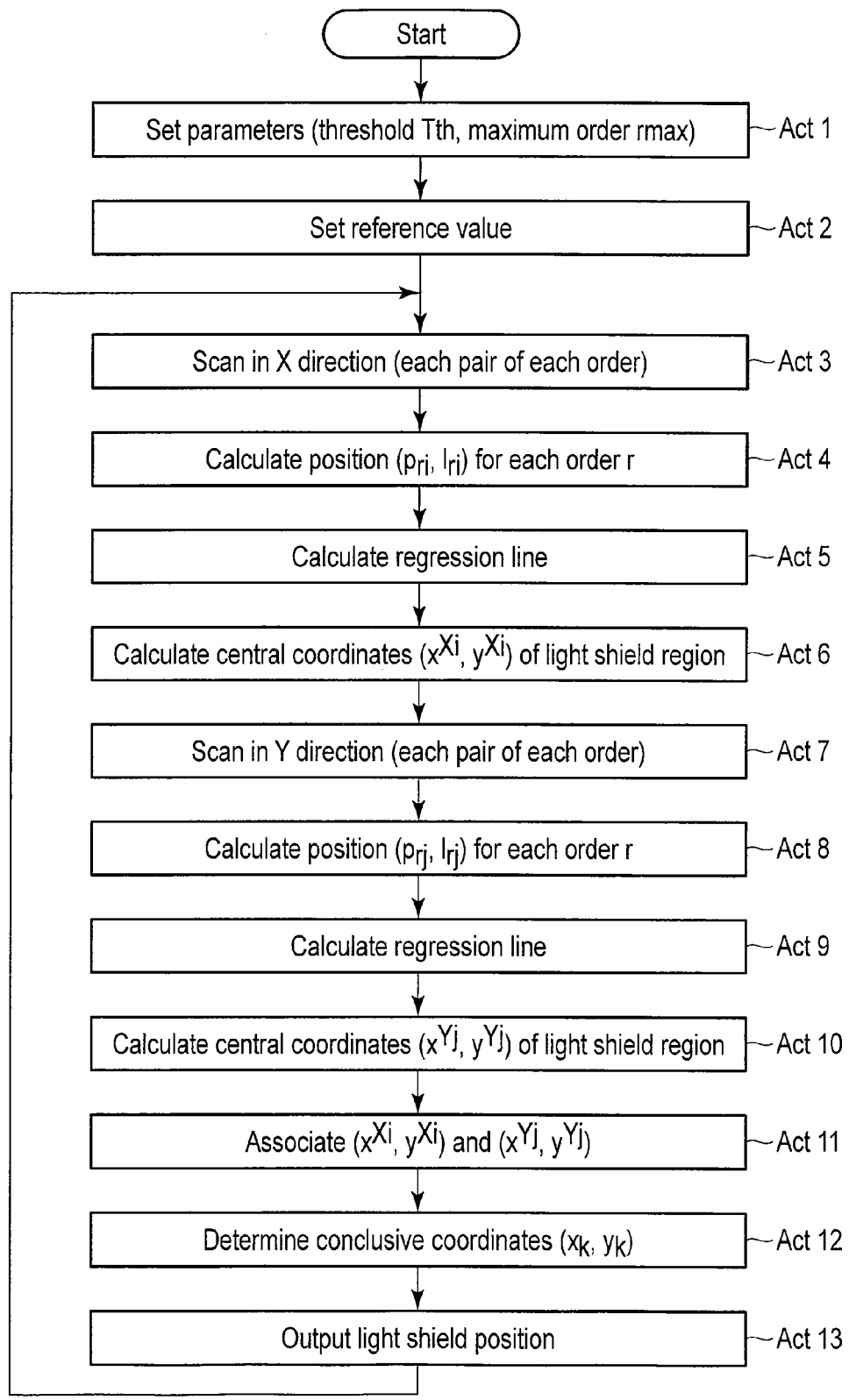
FIG. 13 is a flowchart illustrating actions of the coordinate recognition apparatus according to the embodiment.

Actions of the coordinate recognition apparatus will be described. FIG. 13 is a flowchart illustrating actions of the coordinate recognition apparatus relating to coordinate recognition.

When the coordinate recognition apparatus starts an action relating to coordinate recognition, the controller 2 sets parameters necessary for the action at power-up, for example (Act1). The parameters set in this action include a threshold value $T_{th}$ used for comparison with transmittance and maximum order r max (where r max≥1). The threshold value $T_{th}$ is determined experimentally, empirically, or theoretically, and stored in advance in the ROM 4, for example. The maximum value r max defines the maximum value and the minimum value of order r of the groups of light paths formed for coordinate recognition. That is, the groups of light paths are formed so as to satisfy −r max≤r≤+r max. Assume that the maximum order r max is set to 3 in the present embodiment. In this case, as shown in FIGS. 5 to 11, groups of light paths of orders r=0, +1, +2, +3, −1, −2, −3 are formed.

After setting the parameters, the controller 2 sets a reference value for each pair of a light-emitting device and a light-receiving device corresponding to one of the light paths included in the groups of light paths of each order r, i.e., all the light paths shown in FIG. 12 (Act 2).

More specifically, the controller 2 measures an output from each of the light-receiving devices Px1 to Px12, Py1 to Py9 while the light-emitting devices Lx1 to Lx12, Ly1 to Ly9 are turned off, and stores the measured values in the RAM 5 as background noise of the light-receiving devices Px1 to Px12, Py1 to Py9, from which the output has been made. After that, the controller 2 causes the light-emitting device to emit light and measures an output value from the light-receiving device, and determines a value obtained by subtracting the background noise of the light-receiving device stored in the RAM 5 from the measured output value, in terms of each of the pairs corresponding to all the light paths shown in FIG. 12. The value thus determined will be a reference value of each of the pairs. The controller 2 stores the determined reference value of each of the pairs in the RAM 5.

Actions Act 1, 2 are preparation processes for coordinate recognition. When actions Act 1, 2 are completed, the controller 2 executes actions Acts 3-12 in order to recognize coordinates of the manipulation position, at which the user has manipulated.

That is, the controller 2 causes the light-emitting devices Lx1 to Lx12 and the light-receiving devices Px1 to Px12 arranged in X direction to perform scanning (Act 3). More specifically, the controller 2 forms groups of light paths of orders r=0, +1, +2, +3, −1, −2, −3 shown in FIGS. 5-11 in this order. The light paths included in each of the groups of light paths are formed in a time-division manner in ascending order of LED Number (X) of the light-emitting device of each of the pairs, for example. When a light path is formed by a pair of a light-emitting device and a light-receiving device, the controller 2 measures an output value from the light-emitting device, subtracts background noise of the light-emitting device stored in the RAM 5 in Act 2 from the measured value, obtains a transmittance by dividing the subtracted value by the reference value of the pair stored in the RAM 5 in Act 2, and stores the obtained transmittance in the RAM 5. Thus, the result of measuring each pair forming a light path as shown in FIGS. 5-11 is obtained as a transmittance.

Figure 14:
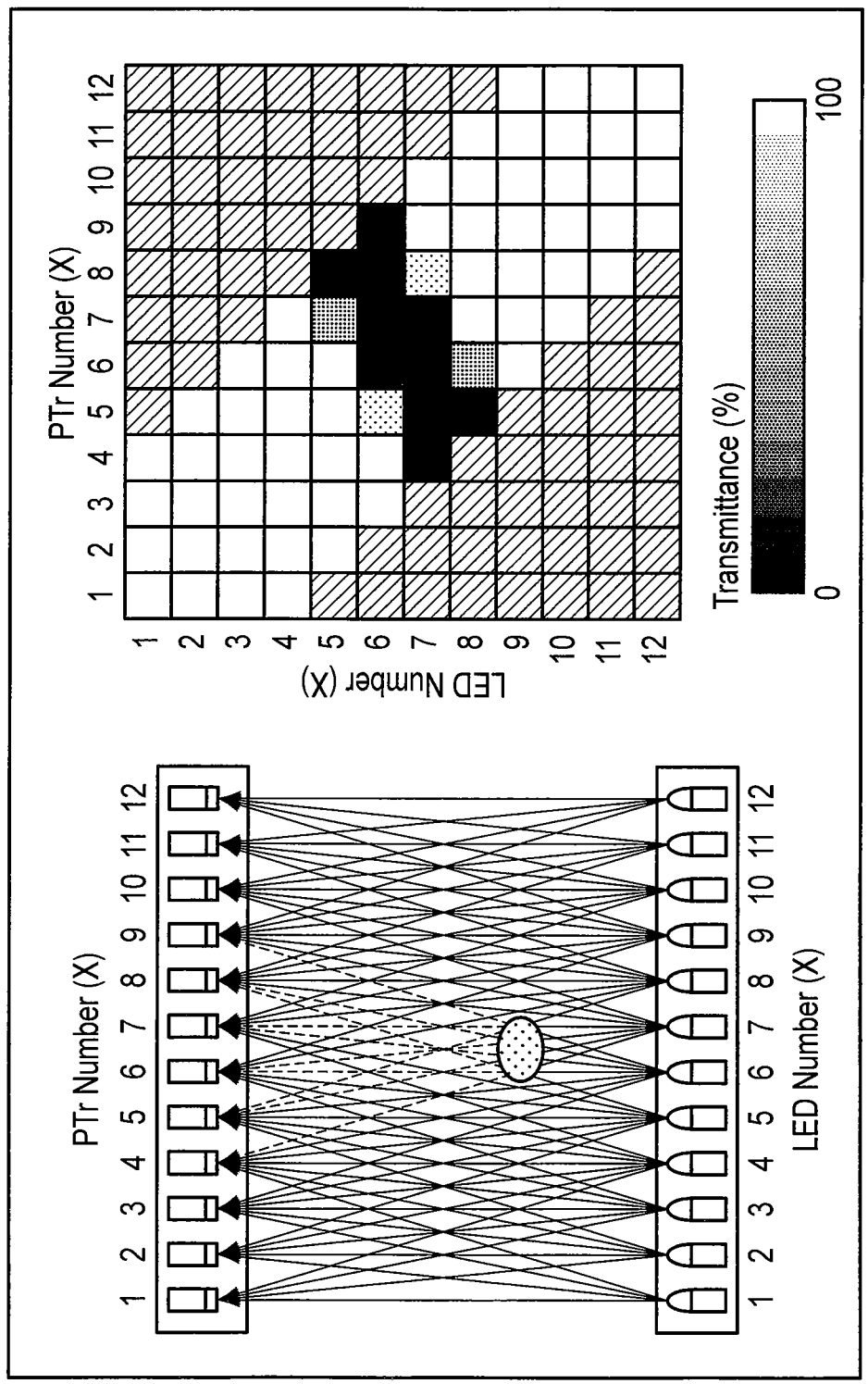
FIG. 14 shows a distribution of transmittances when a light shield region exists, according to the embodiment.

An example of a distribution of transmittances obtained in Act 3 is shown in FIG. 14. This example shows a state in which the oval region at the left part of FIG. 14 is manipulated by a finger of the user, for example, and thereby the light paths are partially interrupted. The solid lines indicate light paths that are not shielded and the dashed lines indicate light paths that have been shielded. In the transmittance distribution shown at the right part of FIG. 14, the regions out of the detection range, i.e., the region other than the region where orders r=0, +1, +2, +3, −1, −2, −3 is diagonally shaded.

As shown in the right part of FIG. 14, the transmittance of a pair corresponding to a shielded light path becomes low. FIG. 14 shows a state in which only one portion on the XY plane is manipulated by the user. When a plurality of portions are manipulated simultaneously, however, a plurality of regions having a low transmittance will appear on the transmittance distribution (see FIG. 18).

After obtaining transmittances in Act 3, the controller 2 calculates, based on the transmittances, a position p of the light-receiving device in X direction corresponding to the light path that passes through the center of the light shield region and a position l of the light-emitting device in X direction corresponding to the same light path, with respect to the group of light paths of each order r (Act 4).

A scheme of calculating the positions p, l will be described with reference to FIG. 15. In the graph shown in FIG. 15, the transmittances of the light paths forming a group of light paths of order r=0 are plotted in the order of PTr Number (X) of the light-receiving device corresponding to each of the light paths, which corresponds to the case where two portions on the XY plane are simultaneously manipulated by the user. The transmittances corresponding to the light paths shielded by the two manipulated portions are lower than a threshold value $T_{th}$. The controller 2 obtains PTr Number (X) corresponding to the center of two intersections of the transmittance and the threshold value $T_{th}$ existing in the neighborhood of the region where the transmittance is lower than the threshold voltage $T_{th}$. In this case, PTr Number (X) to be obtained is not necessarily an integer but an actual number, which can be a decimal numerical value, and is referred to as $p_{ri}$. It is to be noted that r is the above-described order (0 in the example of FIG. 15) and i (which is a positive integer) is an identification number used to identify a plurality of light shield regions. In the present embodiment, the identification number i is assigned in ascending order, starting from 1, to PTr Number (X) corresponding to the center of the two intersections.

When $p_{ri}$ is determined, since order r is known, LED Number (X) corresponding to $p_{ri}$ is obtained by substituting the obtained value of $p_{ri}$ into PTr Number (X) of formula (1). As with LED Number (X), the value of PTr Number (X) to be obtained is not necessarily an integer but an actual number, which can be a decimal numerical value, and is referred to as $l_{ri}$.

Based on the above-described scheme, the position $(p_{ri}, l_{ri})$ of each order r is calculated. In the transmittance distribution shown in FIG. 14, for example, 7 positions $(p_{01}, l_{01})$, $(p_{+11}, l_{+11})$, $(p_{+21}, l_{+21})$, $(p_{+31}, l_{+31})$, $(p_{-11}, l_{-11})$, $(p_{-21}, l_{-21})$, $(p_{-31}, l_{-31})$ are obtained with respect to orders r=0, +1, +2, +3, -1, -2, -3, as indicated by white plotted circles in FIG. 16.

After Act 4, the controller 2 determines a regression line (first regression line) for each identification number i, using the position $(p_{ri}, l_{ri})$ relating to each of the groups of light paths of each of orders r as a sample, with respect to the PL plane in which a position P of the light-receiving device in X direction and a position L of the light-emitting device in X direction are formed as two axes that are orthogonal to each other (Act 5). It is to be noted that the position P of the light-receiving device in X direction is represented by PTr Number (X), and the position L of the light-emitting device in X direction is represented by LED Number (X).

More specifically, in Act 5, the controller 2 calculates a gradient $a_i$ and an intercept $b_i$ of the regression line for each identification number i. The regression line is expressed by formula (2):

$$P = a_i L + b_i \quad (1 \leq i \leq N_x) \quad (2)$$

where $N_x$ denotes the number of light shield regions formed simultaneously on the XY plane, i.e., the maximum value of the identification number i.

For example, when the position $(p_{r1}, l_{r1})$ of the identification number i=1 of each of orders r is calculated in Act 4, as shown in the plot of FIG. 16, the regression line of the position $(p_{ri}, l_{ri})$ will be as shown by S of FIG. 17. Such a regression line can be determined by a known approach, such as least-square approach.

Figure 18:
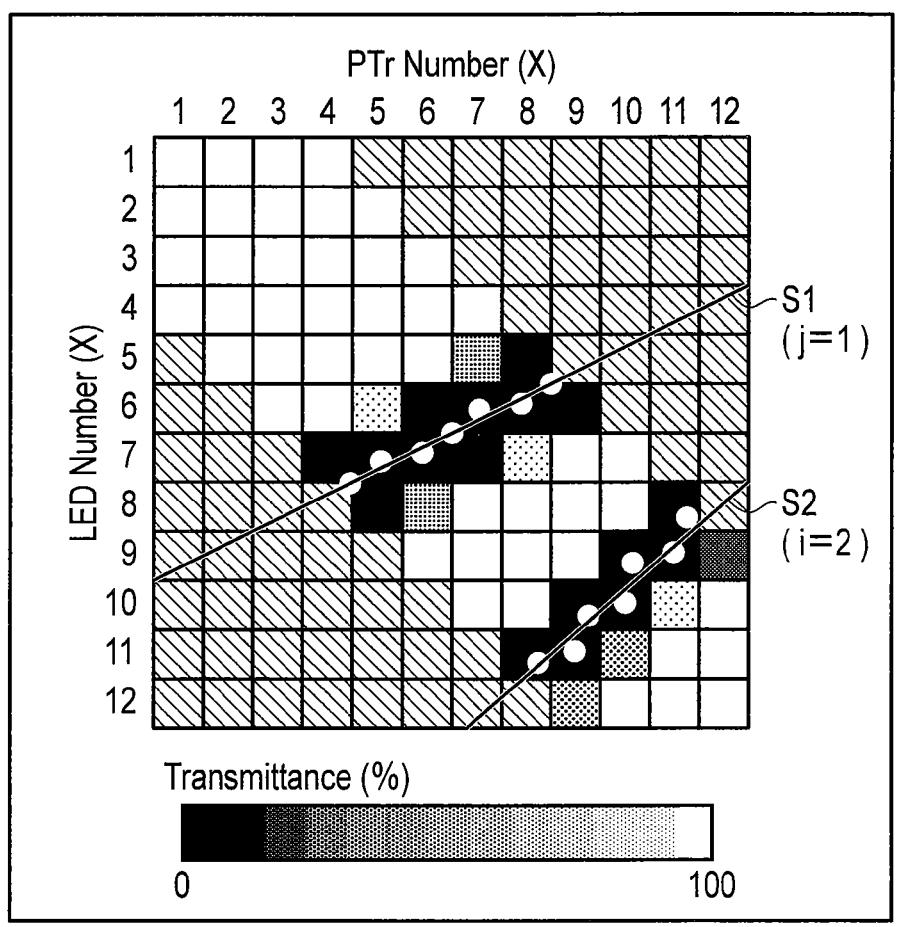
FIG. 18 shows regression lines when a plurality of light shield regions are formed simultaneously, according to the embodiment.

When a plurality of light shield regions are simultaneously formed on the XY plane ($N_x \geq 2$), the controller 2 calculates a gradient $a_i$ and an intercept $b_i$ of each of $N_x$ number of regression lines. FIG. 18 shows transmittance distribution, a plot of the position $(p_{ri}, l_{ri})$, and regression lines when i=2. When two light shield regions exist as in this case, the controller 2 calculates a gradient $a_1$ and an intercept $b_1$ of a regression line S1 corresponding to i=1, and a gradient $a_2$ and an intercept $b_2$ of a regression line S2 corresponding to i=2.

After Act 5, the controller 2 calculates an X-direction coordinate $x^X$ and a Y-direction coordinate $y^X$ for each identification number i, based on the obtained regression line (Act 6). Hereinafter, the coordinates $(x^X, y^X)$ corresponding to the identification number i will be noted as $(x^{Xi}, y^{Xi})$.

Figure 19:
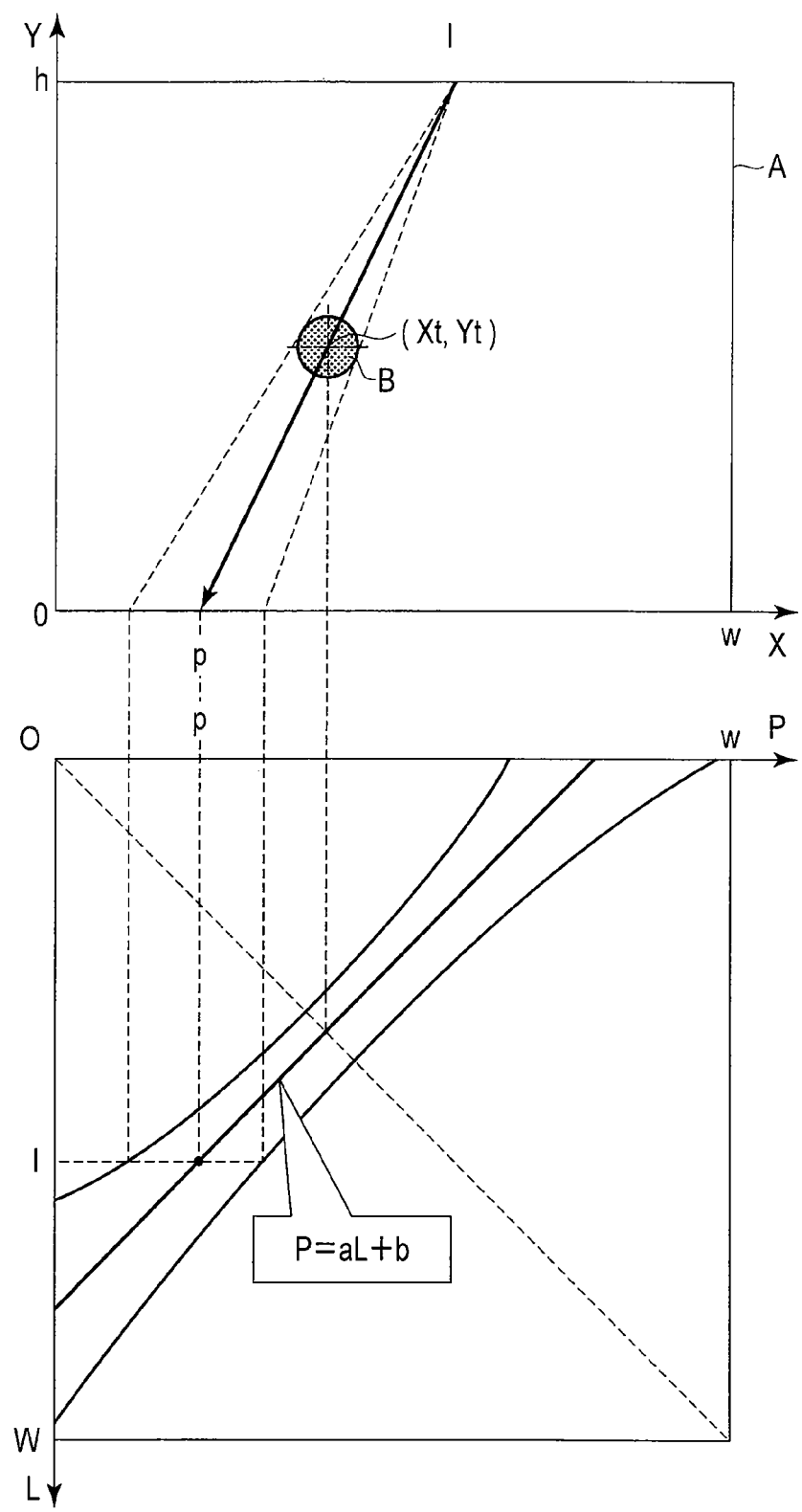
FIG. 19 illustrates a scheme of calculating coordinates ($x^{Xi}$, $y^{Xi}$) according to the embodiment.

A scheme of calculating the coordinates $(x^{Xi}, y^{Xi})$ will be described with reference to FIG. 19. An XY plane is defined as having the origin at the lower left end of the region A shown in FIG. 1 and including X-axis extending along X direction and Y-axis extending along Y direction. The distance (height along Y direction of the region A) between the array of the light-emitting devices Lx1 to Lx12 and the array of the light-receiving devices Px1 to Px12 is represented by h, the distance (width along X direction of the region A) between the array of the light-emitting devices Ly1 to Ly9 and the array of the light-receiving devices Py1 to Py9 is represented by w, the central coordinates of the light shield region B formed by a finger of the user, for example, are represented by $(x_t, y_t)$, the X coordinate of the light-emitting device forming the light path passing through the central coordinates $(x_t, y_t)$ is represented by l, and the X coordinate of the light-receiving device forming the same light path is represented by p. In this case, the relationship between l and p is expressed by the following formula (3):

$$p = \{1 - h/(h - y_t)\} l + h x_t/(h - y_t) \quad (3)$$

Hence, the locus of the center of the light shield region B in the PL plane is expressed by the following formula (4):

$$P = \{1 - h/(h - y_t)\} L + h x_t/(h - y_t) \quad (4)$$

That is, the gradient a and the intercept b of the straight line expressed by formula (4) are expressed by formulas (5) and (6):

$$a = 1 - h/(h - y_t) \quad (5)$$

$$b = h x_t/(h - y_t) \quad (6)$$

Based on the formulas (5) and (6), the central coordinates $(x_t, y_t)$ of the light shield region are expressed by formulas (7) and (8):

$$x_t = b/(1-a) \quad (7)$$

$$y_t = \{-a/(1-a)\} h \quad (8)$$

Since $P = x_t$ is given when $L = P$ is assumed in formula (4), the intersection of the locus of the center of the light shield region and the diagonal $P = L$ give the central coordinates $x_t$ of the light shield region B.

In the present embodiment, assuming that the regression line expressed by the gradient $a_i$ and the intercept $b_i$ obtained in Act 5 agrees with the straight line expressed by formula (4), the coordinates $(x^{Xi}, y^{Xi})$ are calculated. That is, based on the formulas (7) and (8), the coordinates $(x^{Xi}, y^{Xi})$ are obtained from formulas (9) and (10):

$$x^{Xi} = b_i/(1 - a_i) \quad (9)$$

$$y^{Xi} = \{-a_i/(1 - a_i)\} h \quad (10)$$

In Act 6, the controller 2 substitutes the gradient $a_i$ and the intercept $b_i$ obtained in Act 5 into the formulas (9) and (10), and calculates the central coordinates $(x^{Xi}, y^{Xi})$ of the light shield region corresponding to each identification number i.

As described in Acts 3-6, after calculating the central coordinates $(x^{Xi}, y^{Xi})$ of the light shield region using the light-emitting devices Lx1 to Lx12 and the light-receiving devices Px1 to Px12 arranged in X direction, the controller 2 calculates the central coordinates $(x^{Yj}, y^{Yj})$ of the light shield region using the light-emitting devices Ly1 to Ly9 and the light-receiving devices Py1 to Py9 arranged in Y direction.

The procedure of calculating the central coordinates $(x^{Yj}, y^{Yj})$ is similar to the procedure of calculating the central coordinates $(x^{Xi}, y^{Xi})$. That is, the controller 2 causes the light-emitting devices Ly1 to Ly9 and the light-receiving devices Py1 to Py9 arranged in Y direction to perform scanning, as in Act 3 (Act 7).

After obtaining transmittances in Act 7, the controller 2 calculates a position p in Y direction of the light-receiving device corresponding to the light path that passes through the center of the light shield region of each order r, and a position l in Y direction of the light-emitting device corresponding to the same light path, based on the obtained transmittances, as in Act 4 (Act 8). The positions p, l obtained in this action will be referred to as $p_{rj}, l_{rj}$, respectively. In this case, j represents an identification number designed to identify a plurality of light shield regions, and is equivalent to the identification number i.

After Act 8, as in Act 5, the controller 2 determines a regression line (second regression line) for each identification number j, using the position $(p_{rj}, l_{rj})$ relating to each of the groups of light paths of orders r as a sample, with respect to the PL plane in which a position P of the light-receiving device in Y direction and a position L of the light-emitting device in Y direction are formed as two axes orthogonal to each other (Act 9).

After Act 9, as in Act 6, the controller 2 calculates an X-direction coordinate $x^Y$ and a Y-direction coordinate $y^Y$ of the center of the light shield region of each identification number j, based on the calculated gradient $a_j$ and intercept $b_j$ (Act 10). Hereinafter, the coordinates $(x^Y, y^Y)$ corresponding to the identification number j will be referred to as $(x^{Yj}, y^{Yj})$.

Details about actions Act 7 to Act 10 are given by replacing LED Number(X) with LED Number(Y), PTr Number(X) with PTr Number(Y), i with j, $N_X$ with $N_Y$, $p_{ri}$ with $p_{rj}$, $l_{ri}$ with $l_{rj}$, $x^{Xi}$ with $x^{Yj}$, $y^{Xi}$ with $y^{Yj}$, $a_i$ with $a_j$, and $b_i$ with $b_j$, as appropriate, in the description of actions Act 3 to Act 6.

Instead of the formulas (9) and (10), the central coordinates $(x^{Yj}, y^{Yj})$ can be obtained by the following formulas (11) and (12):

$$x^{Yj} = \{-a_j/(1-a_j)\}w \quad (11)$$

$$y^{Xi} = b_j/(1-a_j) \quad (12)$$

After calculating the central coordinates $(x^{Xi}, y^{Xi})$ by causing the light-emitting devices Lx1 to Lx12 and the light-receiving devices Px1 to Px12 to perform scanning (Act 3 to Act 6), and then calculating the central coordinates $(x^{Yj}, y^{Yj})$ by causing the light-emitting devices Ly1 to Ly9 and the light-receiving devices Py1 to Py9 to perform scanning (Act 7 to Act 10), the controller 2 associates the central coordinates $(x^{Xi}, y^{Xi})$ and the central coordinates $(x^{Yj}, y^{Yj})$ with each other (Act 11).

Normally, the maximum value $N_X$ of the identification number i and the maximum value $N_Y$ of the identification number j agree. However, when the user simultaneously operates a plurality of points that are very close to one another, for example, the light shield regions may be overlapped with one another and the maximum values $N_X$, $N_Y$ may not agree. In view of the above, in the present embodiment, the central coordinates $(x^{Xi}, y^{Xi})$ and the central coordinates $(x^{Yj}, y^{Yj})$ are associated based on the premise that the maximum values $N_X$, $N_Y$ do not necessarily agree.

More specifically, the controller 2 calculates a distance $d_{ij}$ between the central coordinates $(x^{Xi}, y^{Xi})$ and the central coordinates $(x^{Yj}, y^{Yj})$ of all the combinations of the identification numbers i, j. The relationship between the obtained distance $d_{ij}$ and the identification numbers i, j are shown in FIG. 20.

After calculating the distance $d_{ij}$, the controller 2 compares the maximum values $N_X$, $N_Y$. When $N_X \geq N_Y$ as a result of this comparison, the controller 2 retrieves the minimum distance $d_{ij}$ of each identification number i. That is, the minimum number is retrieved from each of the columns of the table shown in FIG. 20. After that, the controller 2 associates the central coordinates $(x^{Xi}, y^{Xi})$ and the central coordinates $(x^{Yj}, y^{Yj})$ of the identification numbers i, j, corresponding to the retrieved minimum value. In this case, $N_X$ number of association results are obtained. For example, in the example of FIG. 20, since 5.13, 0.22, 3.4, ... 5.25 are the minimum values in the columns where i=1, 2, 3, ... $N_X$, respectively, the central coordinates $(x^{Xi}, y^{Xi})$ and $(x^{Yj}, y^{Yj})$ are associated for each of the pairs of (i, j)=(1, 2), (2, 2), (3, 1), ... ($N_X$, $N_Y$).

On the other hand, when the result of the comparison is $N_X < N_Y$, the controller 2 retrieves the smallest distance $d_{ij}$ of each identification number j. That is, the controller 2 retrieves the minimum value in each of the lines of the table shown in FIG. 20. After that, the controller 2 associates the central coordinates $(x^{Xi}, y^{Xi})$ and the central coordinates $(x^{Yj}, y^{Yj})$ of the identification numbers i, j, corresponding to the retrieved minimum value. In this case, $N_Y$ number of association results are obtained. In the example of FIG. 20, for example, since 3.4, 0.22, ... 5.25 are the minimum values of the lines where j=1, 2, 3, ... $N_Y$, respectively, the central coordinates $(x^{Xi}, y^{Xi})$ and $(x^{Yj}, y^{Yj})$ of each of the pairs of (i, j)=(3, 1), (2, 2), ... ($N_X$, $N_Y$) are associated.

After Act 11, the controller 2 determines k number of conclusive X-direction coordinates x and conclusive Y-direction coordinates y of the center of the light shield position, based on the result of associations between the central coordinates $(x^{Xi}, y^{Xi})$ and $(x^{Yj}, y^{Yj})$, where is the number of the association results. In this case, k is an integer, and the relation $1 \leq k (=i) \leq N_X$ is satisfied when $N_X \geq N_Y$ and the relation $1 \leq k (=j) \leq N_Y$ is satisfied when $N_X < N_Y$. Hereinafter, k number of coordinates (x, y) determined in Act 12 will be referred to as $(x_k, y_k)$.

More specifically, in Act 12, the controller 2 sets the central coordinates $(x^{Xi}, y^{Xi})$ and $(x^{Yj}, y^{Yj})$ associated in Act 11 such that the coordinate $x_k = x^{Xi}$ and the coordinate $y_k = y^{Yj}$. For example, when $N_X \geq N_Y$ and the central coordinates $(x^{Xi}, y^{Xi})$ and $(x^{Yj}, y^{Yj})$ of each of the pairs of (i, j)=(1, 2), (2, 2), (3, 1), ... ($N_X$, $N_Y$) are associated in the example of the FIG. 20, since $(x_k, y_k) = (x^{X1}, y^{Y2}), (x^{X2}, y^{Y2}), (x^{X3}, y^{Y1}), ... (x^{XNX}, y^{YNY})$, $N_X$ number of coordinates $(x_k, y_k)$ are obtained. Further, when $N_X < N_Y$ and the central coordinates $(x^{Xi}, y^{Xi})$ and $(x^{Yj}, y^{Yj})$ of each of the pairs of (i, j)=(3, 1), (2, 2), ... ($N_X$, $N_Y$) are associated in the example of the FIG. 20, since $(x_k, y_k) = (x^{X3}, y^{Y1}), (x^{X2}, y^{Y2}), ... (x^{XNX}, y^{YNY})$, $N_y$ number of coordinates $(x_k, y_k)$ are obtained.

After Act 12, the controller 2 outputs the determined coordinates $(x_k, y_k)$ into the host computer 60 as manipulation coordinates, at which the user has manipulated. By thus using the manipulation coordinates thus input from the coordinate recognition apparatus 1, the host computer 60 executes a variety of processes.

After Act 12, the controller 2 performs the actions from Act 3 again.

When the user region A is not manipulated by the user, since the light paths of each order r in X direction and Y direction are not shielded, the light shield center $(p_{ri}, l_{ri})$ is not determined in Act 4 to Act 8. In this case, the controller 2 skips actions Act 12 and Act 13, for example, and returns to action Act 3. When the coordinates $(x_k, y_k)$ cannot be determined appropriately, which is regarded as an error, the manipulation coordinates are not output to the host computer and the procedure is returned to Act 3.

Actions from Act 3 to Act 13 are continuously executed until an instruction to stop operation of the coordinate recognition apparatus is given, or the power is interrupted, for example.

As described above, the coordinate recognition apparatus of the present embodiment forms a group of light paths (−r max to r max) by selectively driving the light-emitting devices Lx1 to Lxn and the light-receiving devices Px1 to Pxn arranged in parallel to each other, such that the angle of the light paths varies from group to group, identifies the position $p_X$, $l_X$ for each group of light paths, and calculates the central coordinates $(x^X, y^X)$ of the region in which light is shielded by an object such as a finger of the user, based on the identified positions $p_X$, $l_X$.

Further, the coordinate recognition apparatus forms a group of light paths (−r max to r max) having different light path angles by selectively driving the light-emitting devices Ly1 to Lym and the light-receiving devices Py1 to Pym arranged in parallel to each other, identifies the positions $p_Y$, $l_Y$ of each of the groups of light paths, and calculates the central coordinates ($x^Y$, $y^Y$) of the region in which light is shielded by an object such as a finger of the user, based on the identified positions $p_Y$, $l_Y$.

According to the above-described configuration, since the light paths are formed close to one another in the XY plane, compared to the case where the light paths are formed only by opposite pairs of light-emitting devices and light-receiving devices, the manipulation position, at which the user has manipulated, can be specified with high precision.

Further, according to the above-described configuration, two-dimensional central coordinates ($x^X$, $y^X$) and ($x^Y$, $y^Y$) can be recognized using light-receiving devices and light-receiving devices arranged in a one-dimensional array. While the conclusive coordinates (x, y) are determined using the central coordinates ($x^X$, $y^X$), ($x^Y$, $y^Y$) in the present embodiment, one of the central coordinates ($x^X$, $y^X$), ($x^Y$, $y^Y$) may be configured to be output to the host computer 60. In that case, the configuration of the coordinate recognition device can be simplified, since the light-emitting devices Lx1 to Lxn and the light-receiving devices Px1 to Pxn, or the light-emitting devices Ly1 to Lym and the light-receiving devices Py1 to Pym are not provided.

Of the obtained central coordinates ($x^X$, $y^X$), ($x^Y$, $y^Y$), the coordinate recognition apparatus determines the coordinate $x^X$ as the conclusive X-direction coordinate x of the center of the light shield region, and the coordinate $y^Y$ as the conclusive Y-direction coordinate y of the center of the light shield region.

According to the configuration of the coordinate recognition apparatus of the present embodiment, the coordinate $x^X$ measured using the light-emitting devices Lx1 to Lxn and the light-receiving devices Px1 to Pxn arranged in X direction has a smaller error than the coordinate $x^Y$ measured using the light-emitting devices Ly1 to Lym and the light-receiving devices Py1 to Pym arranged in Y direction. It is thereby estimated that the coordinate $y^Y$ measured using the light-emitting devices Ly1 to Lym and the light-receiving devices Py1 to Pym arranged in Y direction has a smaller error than the coordinate $y^X$ measured using the light-emitting devices Lx1 to Lxn and the light-receiving devices Px1 to Pxn arranged in X direction. Hence, precision in coordinate recognition is further improved by setting $x^X$, $y^Y$ as the conclusive coordinates of the center of the light shield region.

Further, according to the coordinate recognition apparatus of the present embodiment, even when a plurality of light shield regions are simultaneously formed, the central coordinates ($x^X$, $y^X$), ($x^Y$, $y^Y$) of each of the light shield regions or the conclusive central coordinates ($x^X$, $y^Y$) of each of the light shield regions can be calculated.

MODIFICATION EXAMPLE

While the groups of light path are formed in the order of orders r=0, +1, +2, +3, −1, −2, −3 in Act 3 and Act 7 in the above-described embodiments, the groups of light paths of orders r may be formed in another order. Further, while the light paths included in each of the groups of light paths are formed in a time-division manner in ascending order of LED Number (X) of the light-emitting device of each pair in the above-described embodiment, the light paths may be formed in another order. Moreover, an action of forming a light path in a time-division manner between a light-emitting device and a light-receiving device forming a pair with the light-receiving device in each of the groups of light paths of orders r may be performed in terms of all the light-emitting devices.

Even in that case, the groups of light paths as shown in FIGS. 5 to 11 are similarly obtained.

In the above-described embodiment, of the central coordinates ($x^X$, $y^X$), ($x^Y$, $y^Y$) obtained in Act 6 and Act 10, the coordinate $x^X$ is determined as the conclusive X-direction coordinate x of the center of the light shield region, and the coordinate $y^Y$ is determined as the conclusive Y-direction of the center of the light shield region. The coordinate (x, y), however, may be determined by another method, e.g., by determining an intermediate point between the coordinates $x^X$ and $x^Y$ as the coordinate x and determining an intermediate point between the coordinate $y^X$ and $y^Y$ as the coordinate y, for example.

In the above-described embodiment, a case is described where PTr Number (X) corresponding to the center of two intersections of the transmittance and the threshold voltage $T_{th}$ is obtained with respect to each of the regions where the transmittance is lower than the threshold voltage $T_{th}$, and the identification number i is assigned thereto, starting from 1, in ascending order of PTr Number (X), and a regression line is obtained by using the position ($p_{ri}$, $l_{ri}$) to which the same identification number i is assigned as a sample group. However, the above-described sample of one group may be determined by another method. For example, the sample group may be obtained by obtaining one or more positions ($p_r$, $l_r$) for each order r without assigning the identification number i thereto, dividing the positions ($p_r$, $l_r$) into groups using a pattern recognition algorithm based on the distribution of the positions ($p_r$, $l_r$) on the PL plane, and assigning identification numbers i which are different from one another. In the PL plane, the positions ($p_r$, $l_r$) of the same light shield region have a linear correlation as shown in FIG. 16. Accordingly, in the above-described pattern recognition, positions ($p_r$, $l_r$) having such a linear relation should be categorized into one group. The identification number j may also be assigned using pattern recognition, as with the identification number i.

Further, the execution order of the actions shown in the flowchart of FIG. 13 may be varied as appropriate. For example, actions Act 3 to Act 6 may be replaced with actions Act 7 to Act 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coordinate recognition apparatus, comprising:
a plurality of light-emitting devices arranged in an array along an X direction;
a plurality of light-receiving devices arranged in an array parallel to the array of the light-emitting devices and configured to detect light emitted by the light-emitting devices; and
a controller configured to selectively drive the light-emitting devices and the light-receiving devices and form a plurality of groups of light paths each including a plurality of light paths parallel to one another in a plane including the light-emitting devices and the light-receiving devices such that an angle of the light paths varies from group to group, identify a position p and a position l of each of the groups of light paths based on an output from each of the light-receiving devices, the position p being in the X direction of the light-receiving device corresponding to the light path that passes through a center of a region shielded by an object, the position I being in the X direction of the light-emitting device forming the same light path, and calculate coordinates of the center of the light shield region in the plane based on the identified positions p and I of each of the groups of light paths, wherein the controller obtains a regression line using the positions p and I of each of the groups of light paths as a sample, with respect to a PL plane formed by using a position P of each of the light-receiving devices in the X direction and a position L of the light-emitting devices in the X direction as axes, and calculates coordinates of the center based on the obtained regression line, and the controller calculates $b/(1-a)$ using a gradient a and an intercept b of the regression line, sets the calculated result as a coordinate of the center in the X direction, calculates $-ah/(1-a)$ using a distance h between the array of the light-emitting devices and the array of the light-receiving devices and the gradient a, and sets the calculated result as a coordinate of the center in a Y direction orthogonal to the X direction.

2. The apparatus of claim 1, wherein, when a plurality of regions shielded by objects are simultaneously formed, the controller calculates coordinates of the center of each of the regions shielded by objects in the plane.

3. The apparatus of claim 1, wherein, when a plurality of regions shielded by objects are simultaneously formed, the controller obtains a regression line of each of the regions shielded by objects in the plane, and calculates coordinates of the center of each of the regions shielded by objects based on the obtained regression line.

4. A coordinate recognition apparatus, comprising:
a plurality of light-emitting devices arranged in an array along an X direction;
a plurality of light-receiving devices arranged in an array parallel to the array of the light-emitting devices and configured to detect light emitted by the light-emitting devices;
a plurality of light-emitting devices arranged in an array along a Y direction orthogonal to the X direction in the plane;
a plurality of light-receiving devices arranged in an array along the Y direction in the plane and configured to detect light emitted by the light-receiving devices arranged in the Y direction; and
a controller configured to selectively drive the light-emitting devices and the light-receiving devices a plurality of groups of light paths each including a plurality of light paths parallel to one another in a plane including the light-emitting devices and the light-receiving devices such that an angle of the light paths varies from group to group, identify a position p and a position I of each of the groups of light paths based on an output from each of the light-receiving devices, the position p being in the X direction of the light-receiving device corresponding to the light path that passes through a center of a region shielded by an object, the position I being in the X direction of the light-emitting device forming the same light path, and calculate coordinates of the center of the light shield region in the plane based on the identified positions p and I of each of the groups of light paths, wherein the controller:

selectively drives the light-emitting devices and the light-receiving devices arranged in the Y direction and forms a plurality of groups of light paths each including a plurality of light paths parallel to each other in the plane such that an angle of the light paths varies from group to group, identifies a position p and a position I of each of the groups of light paths, formed by the light-emitting devices and the light-receiving devices arranged in the Y direction, based on an output from each of the light-receiving devices arranged in the Y direction, the position p being in the Y direction of the light-receiving device forming the light path that passes through the center of a region shielded by an object, the position I being in the Y direction of the light-emitting device forming the same light path, calculates coordinates of the center of the light shield region based on the identified positions p and I of each of the groups of light paths, determines conclusive coordinates of the center using the coordinates of the calculated center of the light-emitting devices and the light-receiving devices arranged in the X direction, and coordinates of the calculated center of the light-emitting devices and the light-receiving devices arranged in the Y direction, obtains a first regression line using the positions p and I of each of the groups of light paths formed by driving the light-emitting devices and the light-receiving devices arranged in the X direction as a sample, with respect to a PL plane formed by using a position P of each of the light-receiving devices in the X direction and a position L of the light-emitting devices in the X direction as axes, calculates a coordinate $x^x$ in the X direction and a coordinate $y^x$ in the Y direction of the center based on the first regression line, obtains a second regression line using the positions p and I of each of the groups of light paths formed by driving the light-emitting devices and the light-receiving devices arranged in the Y direction as a sample, with respect to the PL plane formed by using a position P of each of the light-receiving devices in the Y direction and a position L of the light-emitting devices in the L direction as axes, calculates a coordinate $x^Y$ in the X direction and a coordinate $y^Y$ in the Y direction of the center based on the second regression line, determines the conclusive coordinates based on the obtained coordinates $x^x$, $y^x$, $x^Y$, and $y^Y$, calculates $b/(1-a)$ using a gradient a and an intercept b of the first regression line, sets the calculated result as the coordinate $x^x$, calculates $-ah/(1-a)$ using a distance h between the array of the light-emitting devices arranged in the X direction and the array of the light-receiving devices arranged in the X direction and the gradient a, sets the calculated result as the coordinate $y^x$, calculates $\{-a/(1-a)\}w$ using a distance w between the array of the light-emitting devices arranged in the Y direction and the array of the light-receiving devices arranged in the Y direction and the gradient a of the second regression line, sets the calculated result as the coordinate $x^Y$, calculates $b/(1-a)$ using the gradient a and the intercept b of the second regression line, and sets the calculated result as the coordinate $y^Y$.

5. The apparatus of claim 4, wherein the controller determines the coordinate $x^x$ as the conclusive coordinate x in the X direction of the center, and determines the coordinate $y^Y$ as the conclusive coordinate y in the Y direction of the center.

6. The apparatus of claim 4, wherein, when a plurality of regions shielded by objects are simultaneously formed, the controller obtains the first and second regression lines of each of the regions shielded by objects in the plane, and calculates the conclusive coordinates x, y of the center of each of the regions shielded by objects based on the obtained first and second regression lines.

7. A method of recognizing coordinates, comprising:
selectively driving a plurality of light-emitting devices arranged in an array along an X direction and a plurality of light-receiving devices arranged in an array parallel to the array of the light-emitting devices and configured to detect light emitted by the light-emitting devices and forming a plurality of groups of light paths each including a plurality of light paths parallel to one another in a plane including the light-emitting devices and the light-receiving devices such that an angle of the light paths varies from group to group;
identifying a position p and a position I of each of the groups of light paths based on an output from each of the light-receiving devices, the position p being in the X direction of the light-receiving device corresponding to the light path that passes through the center of a region shielded by an object, the position I being in the X direction of the light-emitting device forming the same light path; and
calculating coordinates of the center of the light shield region in the plane based on the identified positions p and I of each of the groups of light paths, wherein
a regression line is obtained using the positions p and I of each of the groups of light paths as a sample, with respect to a PL plane formed by using a position P of each of the light-receiving devices in the X direction and a position L of the light-emitting devices in the X direction as axes, and coordinates of the center are calculated based on the obtained regression line, and
b/(1−a) is calculated using a gradient a and an intercept b of the regression line, the calculated result is set as a coordinate of the center in the X direction, −ah/(1−a) is calculated using a distance h between the array of the light-emitting devices and the array of the light-receiving devices and the gradient a, and the calculated result is set as a coordinate of the center in a Y direction orthogonal to the X direction.

8. The method of claim 7, wherein, when a plurality of regions shielded by objects are simultaneously formed, coordinates of the center of each of the regions shielded by objects in the plane are calculated.

9. The method of claim 7, wherein, when a plurality of regions shielded by objects are simultaneously formed, a regression line of each of the regions shielded by objects in the plane is obtained, and coordinates of the center of each of the regions shielded by objects are calculated based on the obtained regression line.

10. A method of recognizing coordinates, comprising:
selectively driving a plurality of light-emitting devices arranged in an array along an arbitrary X direction and a plurality of light-receiving devices arranged in an array parallel to the array of the light-emitting devices and configured to detect light emitted by the light-emitting devices and forming a plurality of groups of light paths each including a plurality of light paths parallel to one another in a plane including the light-emitting devices and the light-receiving devices such that an angle of the light paths varies from group to group;
identifying a position p and a position I of each of the groups of light paths based on an output from each of the light-receiving devices, the position p being in the X direction of the light-receiving device corresponding to the light path that passes through the center of a region shielded by an object, the position I being in the X direction of the light-emitting device forming the same light path;
calculating coordinates of the center of the light shield region in the plane based on the identified positions p and I of each of the groups of light paths;
selectively driving a plurality of light-emitting devices arranged in the Y direction in the plane and a plurality of light-receiving devices arranged in the Y direction in the plane and configured to detect light emitted by the light-receiving devices arranged in the Y direction and forming a plurality of groups of light paths each including a plurality of light paths parallel to one another in the plane such that an angle of the light paths varies from group to group;
identifying a position p and a position I of each of the groups of light paths based on an output from each of the light-receiving devices arranged in the Y direction, the position p being in the Y direction of the light-receiving device corresponding to the light path that passes through the center of the light shield region, the position I being in the Y direction of the light-emitting device forming the same light path;
calculating coordinates of the center of the light shield region based on the identified positions p and I of each of the groups of light paths; and
determining conclusive coordinates of the center using the coordinates of the calculated center of the light-emitting devices and the light-receiving devices arranged in the X direction, and coordinates of the calculated center of the light-emitting devices and the light-receiving devices arranged in the Y direction, wherein
a first regression line is obtained using the positions p and I of each of the groups of light paths formed by driving the light-emitting devices and the light-receiving devices arranged in the X direction as a sample, with respect to a PL plane formed by using a position P of each of the light-receiving devices in the X direction and the position L of the light-emitting devices in the X direction as axes, a coordinate $x^X$ in the X direction and a coordinate $y^X$ in the Y direction of the center are calculated based on the first regression line,
a second regression line is obtained using the positions p and I of each of the groups of light paths formed by driving the light-emitting devices and the light-receiving devices arranged in the Y direction as a sample, with respect to a PL plane formed by using a position P of each of the light-receiving devices in the Y direction and the position L of the light-emitting devices in the L direction as axes, a coordinate $x^Y$ in the X direction and a coordinate $y^Y$ in the Y direction of the center are calculated based on the second regression line,
the conclusive coordinates are determined based on the obtained coordinates $x^X$, $x^Y$, and $v^Y$,
b/(1−a) is calculated using a gradient a and an intercept b of the first regression line, the calculated result is set as the coordinate $x^X$, −ah/(1−a) is calculated using a distance h between the array of the light-emitting devices arranged in the X direction and the array of the light-receiving devices arranged in the X direction and the gradient a, the calculated result is set as the coordinate $y^x$,
{−a/(1−a)}w is calculated using a distance w between the array of the light-emitting devices arranged in the Y direction and the array of the light-receiving devices arranged in the Y direction and the gradient a of the second regression line, the calculated result is set as the coordinate $x^Y$, b/(1−a) is calculated using the gradient a and the intercept b of the second regression line, and the calculated result is set as the coordinate $y^Y$.

11. The method of claim 10, wherein the coordinate $x^X$ is determined as the conclusive coordinate x of the center in the X direction, and the coordinate $y^Y$ is determined as the conclusive coordinate y of the center in the Y direction.

12. The method of claim 10, wherein when a plurality of regions shielded by objects are simultaneously formed, the first and second regression lines of each of the regions shielded by objects in the plane are obtained, and the conclusive coordinates x, y of the center of each of the regions shielded by objects are calculated based on the obtained first and second regression lines.

* * * * *

UNITED STATES PATENT AND TRADEMARK OFFICE
CERTIFICATE OF CORRECTION

PATENT NO.       : 8,786,577 B2
APPLICATION NO.  : 13/286664
DATED            : July 22, 2014
INVENTOR(S)      : Yuishi Takeno, Shinji Saegusa and Takuya Ogishima It is certified that error appears in the above-identified patent and that said Letters Patent is hereby corrected as shown below:

In the Claims

Claim 4, Column 16, lines 31-32 should read:
calculates a coordinate $\underline{x^X}$ [[$x^x$]] in the X direction and a coordinate $\underline{y^X}$ [[$y^x$]] in the Y direction of the center based on the first Claim 4, Column 16, line 45 should read:
obtained coordinates $x^X$, $\underline{y^X}$ [[$v^x$]] $x^Y$, and $y^Y$, Claim 4, Column 16, line 48 should read:
coordinate $\underline{x^X}$ [[$x^x$]], calculates -ah/(1-a) using a distance h Claim 4, Column 16, line 52 should read:
sets the calculated result as the coordinate $\underline{y^X}$ [[$y^x$]], Claim 10, Column 18, line 55 should read:
obtained coordinates $\underline{x^X, y^X, x^Y, \text{and } y^Y}$, Claim 10, Column 18, line 62 should read:
the calculated result is set as the coordinate $\underline{y^X}$ [[$y^x$]], Signed and Sealed this
Fourteenth Day of April, 2015

Michelle K. Lee
*Director of the United States Patent and Trademark Office*